US012437206B2

(12) United States Patent
Antoniewicz

(10) Patent No.: US 12,437,206 B2
(45) Date of Patent: Oct. 7, 2025

(54) APPARATUS AND METHODS FOR EMBEDDING DATA IN GENETIC MATERIAL

(71) Applicant: CustomArray, Inc., Redmond, WA (US)

(72) Inventor: Andrew Michael Antoniewicz, Redmond, WA (US)

(73) Assignee: CustomArray, Inc., Redmond, WA (US)

(*) Notice: Subject to any disclaimer, the term of this patent is extended or adjusted under 35 U.S.C. 154(b) by 0 days.

(21) Appl. No.: 18/725,250

(22) PCT Filed: Dec. 22, 2022

(86) PCT No.: PCT/US2022/053794
§ 371 (c)(1),
(2) Date: Jun. 28, 2024

(87) PCT Pub. No.: WO2023/129469
PCT Pub. Date: Jul. 6, 2023

(65) Prior Publication Data
US 2025/0068931 A1  Feb. 27, 2025

Related U.S. Application Data

(60) Provisional application No. 63/295,756, filed on Dec. 31, 2021.

(51) Int. Cl.
*G06F 3/12* (2006.01)
*G06N 3/123* (2023.01)
(52) U.S. Cl.
CPC .................. *G06N 3/123* (2013.01)
(58) Field of Classification Search
CPC ............ G06N 3/10; G06N 3/123; G06N 3/12
See application file for complete search history.

(56) References Cited

U.S. PATENT DOCUMENTS

2017/0033806 A1\* 2/2017 Arslan ................. G06F 3/0616
2017/0141793 A1\* 5/2017 Strauss ............... H03M 13/611
(Continued)

FOREIGN PATENT DOCUMENTS

WO    WO-2017083177 A1 \* 5/2017 ............. G16B 15/00

OTHER PUBLICATIONS

H. Zolfaghari, D. Rossi and J. Nurmi, "An Explicitly Parallel Architecture for Packet Parsing in Software Defined Networks," 2018 IEEE 29th International Conference on Application-specific Systems, Architectures and Processors (ASAP), Milan, Italy, 2018, pp. 1-4.\*

(Continued)

*Primary Examiner* — Pierre Michel Bataille
(74) *Attorney, Agent, or Firm* — Duane Morris LLP

(57) ABSTRACT

Methods, systems, and apparatuses to encode data for storage in genetic materials. For example, a computing system may segment user data into a plurality of data blocks and generate seed data characterizing a plurality of fountain code seeds. Additionally, the computing system may, for each data block, implement a set of operations that generate one or more data packets. In some instances, the set of operations may include, for each of the plurality of fountain code seeds, determining a bit value and corresponding metaCode value and determining which of the fountain code seeds has a metaCode value of the bit value that matches a value of the bit position identified in the metadata. Moreover, the computing system may, for each data packet, cause an implementation of a second set of operations that synthesize a polynucleotide strand in accordance with at least bit values of the corresponding data packet.

20 Claims, 8 Drawing Sheets

(56) References Cited

U.S. PATENT DOCUMENTS

| | | |
|---|---|---|
| 2018/0137418 A1 | 5/2018 | Roquet et al. |
| 2019/0241951 A1 | 8/2019 | Esfandyarpour et al. |
| 2019/0362814 A1 | 11/2019 | Roquet et al. |
| 2021/0174896 A1 | 6/2021 | Landaeta |
| 2024/0064349 A1* | 2/2024 | Ouedraogo ...... H04N 21/26603 |

OTHER PUBLICATIONS

E. H. Volkerink, A. Khoche and S. Mitra, "Packet-based input test data compression techniques," Proceedings. International Test Conference, Baltimore, MD, USA, 2002, pp. 154-163.*

W.H. Press and J.A. Hawkins, "An Indel-Resistant Error-Correcting Code for DNA-Based Information Storage", Institute for Computational Engineering and Sciences University of Texas at Austin, Dec. 2018.*

US Patent Office (ISA/US), International Search Report and Written Opinion issued Apr. 7, 2023, for International Patent Application No. PCT/US2022/053794.

Antonini et al., DNA-based Media Storage: State-of-the-Art, Challenges, Use Cases and Requirements; HAL Open Science, 2021; In: ISO/IEC JTC 1/SC29/WG1N100017 93rd Meeting, Online, Oct. 18-22, 2021, [retrieved on Mar. 15, 2023]; Retrieved from the Internet, URL: https://hal.science/hal-0344 7138v1, pp. 1-32.

Heinis et al., Survey of Information Encoding Techniques for DNA; In: arXiv, Aug. 27, 2021, [online] [retrieved on Mar. 15, 2023 (Mar. 15, 2023)] Retrieved from the Internet< URL: https://arxiv.org/abs/1906.11062>, pp. 1-27.

* cited by examiner

APPARATUS AND METHODS FOR EMBEDDING DATA IN GENETIC MATERIAL

CROSS-REFERENCE TO RELATED APPLICATION

This application is a national stage application, filed under 35 U.S.C. 371, of International Patent Application No. PCT/US2022/053794, filed Dec. 22, 2022, which claims the benefit of priority to, U.S. Provisional Patent Application No. 63/295,756, filed on Dec. 31, 2021, which applications are expressly incorporated herein by reference to their entirety.

FIELD OF DISCLOSURE

The disclosed embodiments generally related to present disclosure generally relates to the encoding and decoding of data.

BACKGROUND

In some examples, computing systems may encode data, such as a file of a user, for efficient transmission or storage. In such examples, the computing systems may encode data by changing or altering the data into a different format than the original format of the data. Additionally, such computing systems may decode the encoded data or convert the encoded data back to the original format of the data.

SUMMARY

According to one aspect a computing system may comprise a non-transitory, machine-readable storage medium storing instructions, and at least one processor coupled to the non-transitory, machine-readable storage medium. The at least one processor may be configured to segment user data into a plurality of data blocks. In some examples, each data block may include metadata. Additionally, the at least one processor may be configured to generate seed data. In some examples, the seed data characterizing a plurality of Fountain code seeds. Moreover, the at least one processor may be configured to, for each of the plurality of data blocks, implement a first set of operations that generate one or more data packets. In some examples, the set of operations may include determining a bit value identifying a bit position in the metadata and a metaCode value identifying and characterizing information being passed by the corresponding bit value, and determining which of the plurality of Fountain code seeds has a metaCode value of the bit value that matches a value of the bit position identified in the metadata, each of the one or more data packets being associated with a Fountain code seed of the plurality of Fountain code seeds that has the metaCode value of the bit value that matches the value of the bit position identified in the associated metadata. Further, the at least one processor may be configured to, for each data packet, cause an implementation of a second set of operations that synthesize a polynucleotide strand in accordance with at least bit values of the corresponding data packet.

According to another aspect a non-transitory, machine-readable storage medium storing instruction that, when executed by at least one processor of a server, may cause the at least one processor to perform operations that include segmenting user data into a plurality of data blocks. In some examples, each data block may include metadata. Additionally, the at least one processor may perform operations that include generating seed data. In some examples, the seed data may characterize a plurality of Fountain code seeds. Moreover, the at least one processor may perform operations that include, for each of the plurality of data blocks, implementing a first set of operations that generate one or more data packets. In some examples, the set of operations may include determining a bit value identifying a bit position in the metadata and a metaCode value identifying and characterizing information being passed by the corresponding bit value, and determining which of the plurality of Fountain code seeds has a metaCode value of the bit value that matches a value of the bit position identified in the metadata, each of the one or more data packets being associated with a Fountain code seed of the plurality of Fountain code seeds that has the metaCode value of the bit value that matches the value of the bit position identified in the associated metadata. Further, the at least one processor may perform operations that include, for each data packet, causing an implementation of a second set of operations that synthesize a polynucleotide strand in accordance with at least bit values of the corresponding data packet, According to another aspect a method may include segmenting user data into a plurality of data blocks. In some examples, each data block may include metadata. Additionally, the method may include generating seed data. In some examples, the seed data may characterize a plurality of Fountain code seeds. Moreover, the method may include, for each of the plurality of data blocks, implementing a first set of operations that generate one or more data packets. In some examples, the set of operations may include determining a bit value identifying a bit position in the metadata and a metaCode value identifying and characterizing information being passed by the corresponding bit value, and determining which of the plurality of Fountain code seeds has a metaCode value of the bit value that matches a value of the bit position identified in the metadata, each of the one or more data packets being associated with a Fountain code seed of the plurality of Fountain code seeds that has the metaCode value of the bit value that matches the value of the bit position identified in the associated metadata. Further, the method may include, for each data packet, causing an implementation of a second set of operations that synthesize a polynucleotide strand in accordance with at least bit values of the corresponding data packet.

BRIEF DESCRIPTION OF THE DRAWINGS

Like reference numbers and designations in the various drawings indicate like elements.

DETAILED DESCRIPTION

Figure 1:
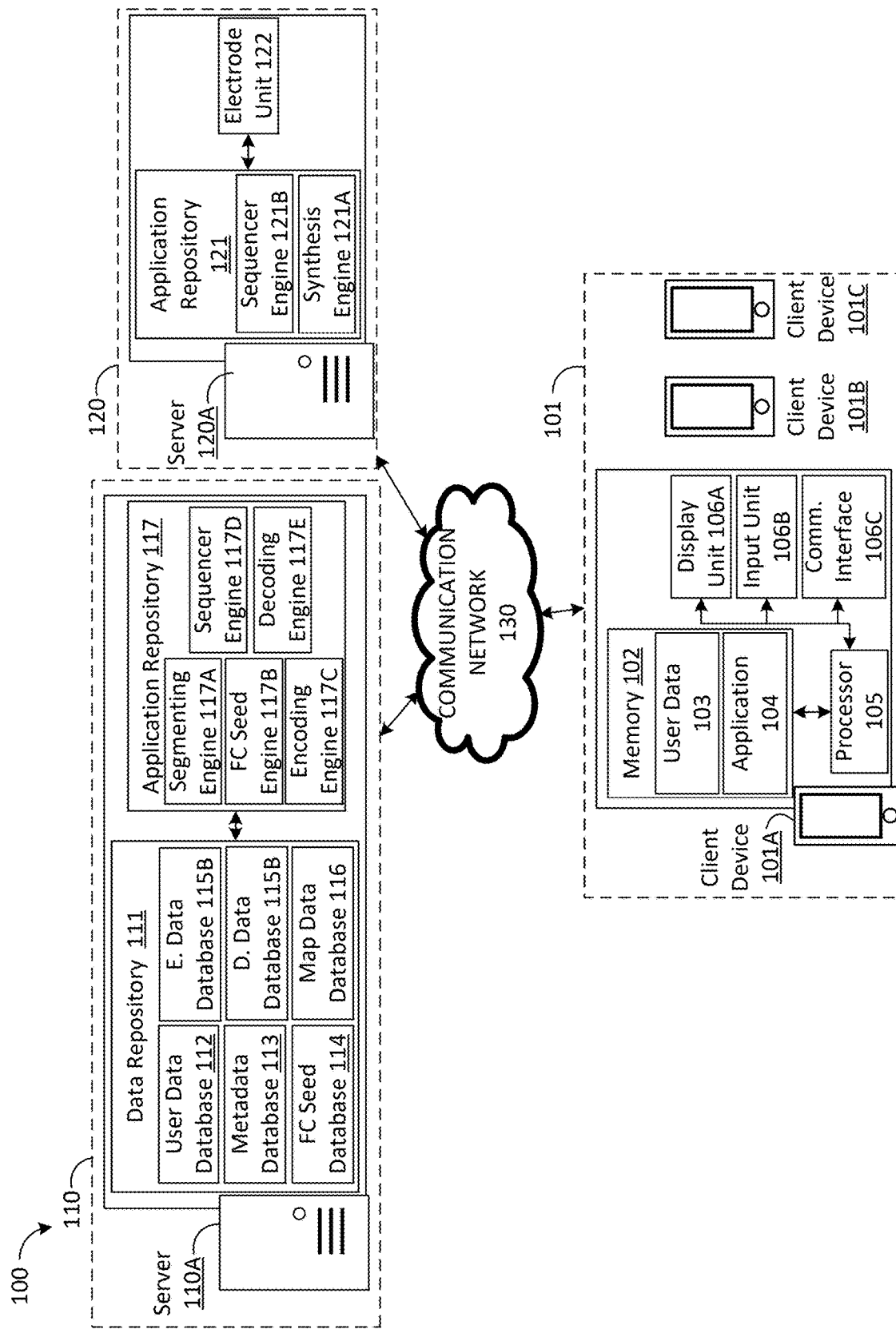
FIG. 1 is a block diagram of an exemplary computing environment, in accordance with some exemplary embodiments.

While the features, methods, devices, and systems described herein may be embodied in various forms, some exemplary and non-limiting embodiments are shown in the drawings, and are described below. Some of the components described in this disclosure are optional, and some implementations may include additional, different, or fewer components from those expressly described in this disclosure.

The embodiments described herein are directed to a computing environment that includes a computing system configured to encode data for storage in genetic materials, such as DNA/RNA utilizing a fountain code processes. Additionally, the computing system may be configured to decode data previously stored in genetic materials, such as DNA/RNA, based on the FC process.

A. Exemplary Computing Environments

FIG. 1 illustrates a block diagram of example computing environment 100 that includes, among other things, one or more computing systems, such as encoder-decoder (ED) computing system 110 and genetic computing system 120, and one or more devices, including one or more client devices 101, such as client device 101A, client device 101B, client device 101C. Each of the one or more computing systems, such as ED computing system 110 and genetic computing system 120, and one or more client devices 101 may each be operatively connected to, and interconnected across, one or more communications networks, such as communications network 130. Examples of communications network 130 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet. In some instances, the computing devices and computing systems operating within computing environment 100 may perform operations that establish and maintain one or more secure channels of communication across communications network 130, such as, but not limited to, a transport layer security (TLS) channel, a secure socket layer (SSL) channel, or any other suitable secure communication channel.

As described herein, the one or more client devices 101, such as client device 101A, may each transmit a user file or user data to ED computing system 110. Further, as described herein, ED computing system 110 may implement operations that encode data for storage in genetic materials, such as DNA/RNA utilizing a fountain code (FC) processes, and may, in some instances, decode data previously stored in such genetic materials, based on the FC process. Additionally, the one or more client devices 101, such as client device 101A, may include a computing device having one or more tangible, non-transitory memories, such as memory 102, configured to execute the software instructions. The one or more tangible, non-transitory memories may, in some aspects, store software applications, application modules, and other elements of code executable by the one or more processors, such as, but not limited to, an executable web browser (e.g., Google Chrome™, Apple Safari™, etc.), and additionally or alternatively, an executable application (e.g., application 104) associated with a computing system, such as ED computing system 110. In some instances, not illustrated in FIG. 1, memory 102 may also include one or more structured or unstructured data repositories or databases, and teach of the one or more client devices 101 may maintain one or more elements of device data and location data within the one or more structured or unstructured data repositories or databases. For example, the elements of device data may uniquely identify client device 101 within computing environment 100, and may include, but are not limited to, an Internet Protocol (IP) address assigned to client device 101 or a media access control (MAC) layer assigned to client device 101A.

Moreover, the one or more client devices 101, such as client device 101A may also include a display unit 106A configured to present interface elements to a corresponding user and an input unit 106B configured to receive input from the user. For example, input unit 106B configured to receive input from the user in response to the interface elements presented through display unit 106A. By way of example, display unit 106A may include, but is not limited to, an LCD display unit or other appropriate type of display unit, and input unit 106B may include, but is not limited to, a keypad, keyboard, touchscreen, voice activated control technologies, or appropriate type of input unit. Further, in additional aspects (not illustrated in FIG. 1), the functionalities of display unit 106A and input unit 106B may be combined into a single device, such as, a pressure-sensitive touchscreen display unit that presents interface elements and receives input from the user of client device 101, such as client device 101A. The one or more client devices 101 may also include a communications interface 106C, such as a wireless transceiver device, coupled to processor 105 and configured by processor 105 to establish and maintain communications with communications network 130 via one or more communication protocols, such as WiFi®, Bluetooth®, NFC, a cellular communications protocol (e.g., LTE®, CDMA®, GSM®, etc.), or any other suitable communications protocol.

Examples of the one or more client devices 101 may include, but not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on an interface device or unit, such as display unit 106A. In some instances, the client device 101 may also establish communications with one or more additional computing systems or devices operating within computing environment 100 across a wired or wireless communications channel (via the communications interface 106C using any appropriate communications protocol). Further, a user, may operate client device 101 and may do so to cause client device 101 to perform one or more exemplary processes described herein.

Referring back to FIG. 1, encoder-decoder (ED) computing system 110 may represent a computing system that includes one or more servers, such as server 110A, and one or more tangible, non-transitory memory devices storing executable code, application engines, or application modules. Each of the one or more servers may include one or more processors, which may be configured to execute portions of the stored code, application engines or modules, or application programs to perform operations consistent with the disclosed exemplary embodiments. For example, as illustrated in FIG. 1, the one or more servers of ED computing system 110 may include server 110A having one or more processors configured to execute portions of the stored code, application engines or modules, or application programs maintained within the one or more tangible, non-transitory memories.

In some instances, ED computing system 110 may correspond to a discrete computing system, although in other instances, ED computing system 110 may correspond to a distributed computing system having multiple, computing components distributed across an appropriate computing network, such as communications network 130 of FIG. 1, or those established and maintained by one or more cloud-based providers, such as Microsoft Azure™, Amazon Web Services™, or another third-party, cloud-services provider. Further, ED computing system 110 may also include one or more communications interfaces, such as one or more wireless transceivers, coupled to the one or more processors for accommodating wired or wireless internet communication across communications network 130 with other computing systems and devices operating within computing environment 100 (not illustrated in FIG. 1).

As described herein, ED computing system 110 may perform any of the exemplary processes described herein to, among other things, encode data for storage in genetic materials, such as DNA/RNA utilizing a fountain code (FC) processes. Additionally, ED computing system 110 may, in some examples, decode data previously stored in such genetic materials, based on the FC process. To facilitate the performance of these exemplary processes, ED computing system 110 may maintain within the one or more tangible, non-transitory memories, such as data repository 111 that includes, but is not limited to user data database 112, metadata database 113, fountain code (FC) seed database 114, encoded data database 115A, decoded data database 115B, and map data database 116. User data database 112 may store user data received from one or more client devices 101. In some instances, user data database 112 may store one or more segments or data blocks of user data received from the one or more client devices 101. In such instances, server 110A of ED computing system 110 may execute processes, described herein to segment user data into one or more segments or data blocks. In various instances, each of the one or more segments or data blacks may be non-overlapping and may be roughly of equal size (e.g., equal bit length).

Additionally, metadata database 113 may store metadata generated by ED computing system 110. Each portion of the metadata may identify and characterize information about a corresponding segment or data block stored in user data database 112. Examples of information of the one or more segments or data blocks includes, an identifier associated with a corresponding segment or data block (e.g., block identifier), an identifier associated with each data element included in the corresponding segment or data block (e.g., bit identifier), information or value associated with each data element, such as "isZero," "isOne," or "noInfo.". As described herein the information or value associated with each data element may represent a state of multiple states. For instance, data elements that have a value representing a state that is "isZero" or "isOne," may each be passing a value of 0 or 1 respectively. In another instance, data elements that have a value representing a state that is "noInfo," may each not be passing any particular information about a particular state. In some instances, the "noInfo" state may be used as a delimiter to separate multiple parameter values and as a filler for any metadata bits which are in excess of those required for transmission.

Moreover, in some instances, the information of the one or more segments or data blocks may include a hash value identifying and characterizing information of the corresponding segment or data block (e.g., a hash value corresponding to a data block identifier). Further, the metadata may include encoding-decoding information that characterizes and identifies a number of encoding-decoding parameters. Each encoding-decoding parameter may characterize a characteristic of the encoding and decoding process used for the received user data, such as the one or more segments or data blocks. In some instances, the encoding-decoding parameters may be based in part and depend on the size of the received or obtained user data.

Moreover, FC seed database 114 may store seed data generated by ED computing system 110. The seed data may identify and characterize a number of fountain code seeds. Additionally, the size of the fountain code seed may be fixed or a fixed number of values, such as 26 to 32 bits. Moreover, the size of the fountain code seed may be based on the size of the user data. Further, a particular fountain code seed may correspond to information sufficient to describe contents of payload of a corresponding data packet of an encoded random set of data elements for ED computing system 110 to use when decoding the data packet. Moreover, ED computing system 110 may embed or include within one or more or each fountain code seed, information of metadata of one or more segments or data blocks stored in metadata database 113. In some instances, FC seed database 114 may store seed metadata or metacode. In such instances, ED computing system 110 may perform operations that generate metadata or meta code of a fountain code seed utilizing one or more mixing functions, as described herein. The one more mixing functions may be deterministic-producing the same result for a specific data packet, no matter what order the data packets are processed. Additionally, the one or more mixing functions may not be biased and may have a very flat distribution over the entire set of results.

Further, encoded data database 115A may store one or more data packets of encoded the received user data. In some examples, ED computing system 110 may encode the received user data by applying a class of erasure codes, such as a fountain code (e.g., a Luby Transform), to the received user data. In some instances, ED computing system 110 may, for each data block, apply a fountain code to each data element of each corresponding data block and generate and package into one or more portions of a data packet a random set of data elements. In such instances, ED computing system 110 may combine the random set of data elements together, bitwise, under a binary field. The combined random set of data elements may be the payload of the corresponding data package and may include information necessary to describe the original user data when processed, such as decoded, with a sufficient number of other data packets. Additionally, ED computing system 110 may include, for each data packet, a fountain code seed that corresponds to contents of a payload within a corresponding data packet.

As described herein, the fountain code seed may have a size that is a fixed-length set of random values. Additionally, the fixed-length set of random values may correspond to information sufficient to describe the contents of the payload for ED computing system 110 to use when decoding the data packets. Moreover, the fountain code seed may include information of the metadata of one or more segments or data blocks stored in metadata database 113. Further, the data packet may be formatted such that the fountain code seed may be in front of the payload or behind.

In some instances, encoded data database 115A may store the encoding-decoding parameters that ED computing system 110 may utilize when encoding the received data packets, as described herein. In such instances, the encoding-decoding parameters may indicate the size of the Fountain Code seed and/or the payload within the data packets. In various instances, the encoding-decoding parameters may indicate a format of the data packets (e.g., the fountain code seed is in front of or behind the payload, size or length of the error correction code (ECC) in the data packets, etc.)

Additionally, decoded data database 115B may store data corresponding to the original user data that was decided from one or more data packets. In some instances, decoded data database 115B may include decoded block data. In such instances, ED computing system 110 may decode one or more data packets to rebuild one or more data blocks of the user data. In other instances, decoded data database 115B may include the rebuilt user data corresponding to the original user data received from client device 101 of the user. In such instances, ED computing system 110 may combine the one or more decoded block data to generate or rebuild the original user data corresponding to the original data. In some instances, decoded data database 115B may store the encoding-decoding parameters that ED computing system 110 may utilize when decoding the encoded data packets, as described herein. In such instances, the encoding-decoding parameters may indicate the size of the Fountain Code seed and/or the payload within the data packets. In various instances, the encoding-decoding parameters may indicate a format of the data packets (e.g., the fountain code seed is in front of or behind the payload, size or length of the ECC in the data packets, etc.)

Moreover, map data database 116 may store mapping data. The mapping data may identify a particular base and corresponding bit pair. The mapping data may be modified and generated by an operator of ED computing system 110. Examples of bit pair and corresponding base may include 00=adenine, 01=cytosine, 10=guanine, and 11=thymine. In some instances, map data database 116 may store sequence mapping data generated by ED computing system 110. Sequence mapping data may include data identifying a corresponding sequence of bases of the obtained data packet.

Further and to facilitate the performance of any of the exemplary processes described herein, ED computing system 110 may include server 110A that may maintain within one or more tangible non-transitory memories, an application repository 117. As illustrated in FIG. 1, application repository 117 may include, among other things, segmenting engine 117A, FC seed engine 117B, encoding engine 117C, sequencer engine 117D and decoding engine 117E. In some examples, segmenting engine 117A may be executed by one or more processors of server 110A to obtain from a client device 101, such as client device 101A operated by a user, user data, and segment the user data into one or more segments or data blocks. For example, executed segmenting engine 117A may receive user data from client device 101A. Additionally, executed segmenting engine 117A may segment the user data into multiple (e.g., 4 to 2048) smaller data blocks of roughly equal non-overlapping size. In some instances, executed segmenting engine 117A may generate store the one or more segments or data blocks within corresponding portions of data repository 111, such as user data database 112.

Additionally, executed segmenting engine 117A may generate, for each data block or segment, metadata that identifies and characterizes information about the corresponding data block or segment. As described herein, examples of information of the one or more segments or data blocks includes, an identifier associated with a corresponding segment or data block (e.g., block identifier), an identifier associated with each data element included in the corresponding segment or data block (e.g., bit identifier), information or value associated with each data element (e.g., "isZero," "isOne," or "noInfo."), and a hash value identifying and characterizing information of the corresponding segment or data block (e.g., a hash value corresponding to a data block identifier). Additionally, the metadata may include encoding-decoding information that characterizes and identifies a number of encoding-decoding parameters. Each encoding-decoding parameter may characterize a characteristic of the encoding and decoding process used for the received user data, such as the one or more segments or data blocks. In some instances, the encoding-decoding parameters may be based in part and depend on the size of the received or obtained user data. In some instances, executed segmenting engine 117A may generate store the metadata within corresponding portions of data repository 111, such as metadata database 113.

As illustrated in FIG. 1, fountain code (FC) seed engine 117B may be executed by one or more processors of server 110A to generate seed data. As described herein, the seed data may identify and characterize a number of fountain code seeds. Executed FC seed engine 117B may implement a random generator process to generate each of the fountain code seeds included in the seed data. Each of the fountain code seeds may include a set or fixed number of random values, such as 26 to 32 bits. In some examples, executed FC seed engine 117B may generate a fountain code seed based on the size of the user data. For instance, executed FC seed engine 117B may obtain, from user data database 112 all the segments or data blocks that make up the user data or prior to segmentation, the entire user data. Additionally, executed FC seed engine 117B may determine a size of the user data based on all the segments or data blocks or the user data itself. Based on the determined size of the user data, executed FC seed engine 117B may generate a fountain code seed corresponding to the size of the user data (e.g., larger the size of the user data, the larger the size of the fountain code seed). Additionally, the fountain code seed generated by executed FC seed engine 117B may correspond to a particular data block and a set of data elements associated with the particular data block. In some instances, the set of random values included in a fountain code seed may identify the particular data block the fountain code seed is associated with, a number of data elements included in the set of data elements associated with the particular data block, and which data elements are the number of data elements included in the set of data elements associated with the particular block. In such instances, executed FC seed engine 117B may generate such fountain code seed based on portions of metadata stored in metadata database 113 associated with the particular block. As described herein, the fountain code seed may include information sufficient to describe contents of a corresponding data packet that ED computing system 110 may use when decoding the corresponding data packet. In some instances, executed FC seed engine 117B may generate seed data that includes one or more fountain code seed generated by executed FC seed engine 117B.

In other instances, executed FC seed engine 117B may embed or include within the fountain code seeds, portions of the metadata stored in metadata database 113 that characterizes and identifies a number of encoding-decoding parameters. In such instances, each encoding-decoding parameter may characterize a characteristic of the encoding and decoding process used for the received user data, such as the one or more segments or data blocks. As described herein, the encoding-decoding parameters may be based in part and depend on the size of the received or obtained user data.

Additionally, executed FC seed engine 117B may, for each of one or more fountain code seeds, generate a corresponding seed metadata or metacode. In such instances, for each of the one or more fountain code seeds, executed FC seed engine 117B may apply one or more mix functions to the corresponding fountain code seed to generate the corresponding seed metadata or metacode. As described herein, the one more mixing functions may be deterministic-producing the same result for a specific data packet, no matter what order the data packets are processed, not be biased and may have a very flat distribution over the entire set of results. In some instances, each of the one or more mixing functions may include a set of xor-shift functions configured for long cycle pseudo-random number generation.

In some examples, a mixing function may include, a mixing function that when applied to a fountain code seed causes executed FC seed engine 117B to generate a data block or segment identifier associated with a valid data block. The data block or segment identifier may identify the data block or segment associated with the random set of data elements included in a data packet of a random set of data elements that are encoded. Further, the data block or segment identifier may indicate to ED computing system 110, which data block or segment the random set of elements is associated with during the decoding process. In some instances, the mixing function may generate the data block or segment identifier based on the values of the fountain code seed and the size of the fountain code seed. In other examples, a mixing function may include, a mixing function that when applied to a fountain code seed causes executed FC seed engine 117B to generate, for each identified data element in the set of random values included in the fountain code seed, a value representing one of multiple possible states the corresponding data element can take on (e.g., "isZero," "isOne," "noInfo"). In various examples, a mixing function may include, a mixing function that when applied to a fountain code seed causes executed FC seed engine 117B to generate, for each identified data element in the set of random values included in the fountain code seed, a value representing the corresponding metadata bit. In some instances, the value representing the corresponding metadata bit may indicate to ED computing system 110, which generated value representing one of multiple states is associated with which data element. In other instances, the value may be between zero and the metadata size minus one. In various instances, all fountain code seeds and associated data packets may be processed using the same configured mixing functions.

Referring back to FIG. 1, executed FC seed engine 117B may generate, for each fountain code seed, seed metadata. The seed metadata may include the corresponding data block or segment identifier, the corresponding value(s) representing the one of multiple states, and the corresponding value(s) representing the metadata bit. In some instances, executed FC seed engine 117B may store, the seed metadata of each fountain code seed within corresponding portions of data repository 111, such as FC seed database 114.

By way of example, a first mixing function may be configured to generate a data block or segment identifier associated with a valid data block, a second mixing function may be configured to generate, for each identified data element in the set of random values included in the fountain code seed, a value representing one of multiple possible states the corresponding data element can take on (e.g., "isZero," "isOne," "noInfo"), and a third mixing function may be configured to generate, for each identified data element in the set of random values included in the fountain code seed, a value representing the corresponding metadata bit. In such an example, executed FC seed engine 117B may obtain seed data and apply the first mixing function, the second mixing function and the third mixing function to a particular fountain code seed (e.g., 24-32 bit) of the seed data. Additionally, based on the application of the first mixing function to the particular fountain code seed, executed FC seed engine 117B may generate a 2-11 bit data block or segment identifier that represents a particular data block or segment associated with the particular fountain code seed. Moreover, based on the application of the second mixing function to the particular fountain code seed, executed FC seed engine 117B may generate a value, such as "isZero," "isOne," "noInfo," associated with each element identified in the particular fountain code seed. Further, based on the application of the third mixing function to the particular fountain code seed and for each of the elements identified in the particular fountain code seed, executed FC seed engine 117B may generate a value that represents the specific metadata bit.

Referring back to FIG. 1, encoding engine 117C may be executed by one or more processors of server 110A to encode user data obtained from one or more client devices 101. In some examples, executed encoding engine 117C may encode each segment or data block of the user data. In such examples, executed encoding engine 117C may encode multiple segments or data blocks of the user data simultaneously or in parallel, or alternatively in series. Additionally, executed encoding engine 117C may, for each data block or segment, apply a fountain code (e.g., a Luby Transform) to each data element of each corresponding data block or segment. Moreover, executed encoding engine 117C may generate and package into one or more portions of a data packet a random set of data elements. Further, executed encoding engine 117C may combine the random set of data elements together, bitwise, under a binary field. The combined random set of data elements may be the payload of the corresponding data package and may include information necessary to describe the original user data when processed, such as decoded, with a sufficient number of other data packets.

In some examples, executed encoding engine 117C may utilize fountain code seed data to generate the one or more data packets. In such examples, executed encoding engine 117C may obtain metadata of each segment or data block of the user data obtained from one or more client devices 101, such as client device 101A, to initialize the executed encoding engine 117C. Additionally, executed encoding engine 117C may obtain, from FC seed database 114, seed data and corresponding seed metadata. Moreover, for each data block or segment, executed encoding engine 117C may select a particular potential fountain code seed. Based on the corresponding seed metadata of the potential fountain code seed and metadata associated with the corresponding data block or segment, executed encoding engine 117C may determine whether the identifier identified in the metadata of the corresponding data block or segment matches the data block or segment identifier of the seed metadata. In examples where executed encoding engine 117C determines the identifier identified in the metadata of the corresponding data block or segment does not match the data block or segment identifier of the seed metadata, executed encoding engine 117C may select another potential fountain code seed. Additionally, executed encoding engine 117C may repeat the process of determining whether the identifier identified in the metadata of the corresponding data block matches the data block identifier of the seed metadata of the second potential fountain code seed. Executed encoding engine 117C may keep repeating the process until the data block identifier of a potential fountain code matches the identifier identified in the metadata of the corresponding data block.

In examples where executed encoding engine 117C determines the identifier identified in the metadata of the corresponding data block or segment matches the data block or segment identifier of the seed metadata, executed encoding engine 117C may determine whether the potential fountain code seed has been utilized to generate another data packet of a random set of data elements. In examples where executed encoding engine 117C determines the fountain code seed has been utilized to generate another data packet of a random set of data elements, executed encoding engine 117C may select another potential fountain code seed. As described herein, executed encoding engine 117C may repeat the above described processes to determine a potential fountain code seed that includes a data block identifier that matches the identifier identified in the metadata of the corresponding data block and that hasn't been utilized to generate another data packet of a random set of data elements.

In examples where executed encoding engine 117C determines the potential fountain code seed has not been utilized to generate another data packet of a random set of data element, executed encoding engine 117C may determine whether the one or more values that represent in the corresponding metadata bit in the seed metadata and corresponding value that represents one of multiple states (e.g., "isZero," "isOne," "noInfo") are identified in the metadata of the corresponding block data or segment. In examples where executed encoding engine 117C determines the one or more values that represent in the corresponding metadata bit in the seed metadata and corresponding value that represents one of multiple states are not identified in the metadata of the corresponding block data or segment, executed encoding engine 117C may select another potential fountain code seed. As described herein, executed encoding engine 117C may repeat the above described processes to determine a potential fountain code seed that (1) includes a data block identifier that matches the identifier identified in the metadata of the corresponding data block, (2) that hasn't been utilized to generate another data packet of a random set of data elements, and (3) includes one or more values that represent in the corresponding metadata bit in the seed metadata and corresponding value that represents one of multiple states (e.g., "isZero," "isOne," "noInfo") are identified in the metadata of the corresponding block data.

In examples where executed encoding engine 117C determines the one or more values that represent in the corresponding metadata bit in the seed metadata and corresponding value that represents one of multiple states are identified in the metadata of the corresponding block data or segment, executed encoding engine 117C may utilize the potential fountain code seed and/or corresponding seed metadata to generate a data packet with a payload corresponding to the potential fountain code seed. For example, the payload may include the set of random data elements identified in the potential fountain code seed and/or corresponding seed metadata. Additionally, as described herein, each data element of the set of random data elements may be encoded, by executed encoding engine 117C, using fountain code (e.g., a Luby Transform). In some instances, executed encoding engine 117C may combine each of the encoded data elements of the set of random data elements and package the combined encoded data elements into one or more portions of the data packet. Moreover, as described herein, executed encoding engine 117C may package into one or more portions of the data packet, the corresponding potential fountain code seed. As described herein, the fountain code seed may have a size that is a fixed-length set of random values, and may correspond to information sufficient to describe the set of random data elements included in the payload of the data packet. ED computing system 110 to use when decoding the data packets. Further, as described herein, the fountain code seed may include information of the metadata of the corresponding segment or data block. In some instances, executed encoding engine 117C may store the generated data packet within corresponding portions of data repository 111, such as encoded data database 115A.

In other examples, executed encoding engine 117C may add an error correction code (ECC) in the data packet. The ECC may be utilized by ED computing system 110 to control errors in the corresponding data packet during the decoding process (e.g., utilized to recover missing bits during the decoding process or correct erroneous bits). In some, instances the encoding-decoding parameters may indicate the corresponding data packet is formatted such that the ECC is behind the payload. In such instances, based on the encoding-decoding parameters, executed encoding engine 117C may generate a data packet with an ECC code behind the payload.

As illustrated in FIG. 1, sequencer engine 117D may be executed by one or more processors of server 110A to generate sequence mapping data for each of one or more data packets stored in encoded data database 115A. In such examples, executed sequencer engine 117D may obtain mapping data from map data database 116. As described herein, mapping data may identify a particular base and corresponding bit pair. The mapping data may be modified and generated by an operator of ED computing system 110. Examples of bit pair and corresponding base may include bit pair 00 corresponds to adenine, bit pair 01 corresponds to cytosine, bit pair 10 corresponds to guanine, and bit pair 11 corresponds to thymine. Additionally, executed sequencer engine 117D may obtain, a data packet stored in encoded data database 115A. Moreover, executed sequencer engine 117D may identify or determine the sequence of bits of the fountain code seed and the payload (e.g., the encoded random set of data elements) included in the data packet. Based on the determined or identified sequence of bits of the data packet and the mapping data, executed sequencer engine 117D may determine a corresponding sequence of bases. Further, based on the determined corresponding sequence of bases, executed sequencer engine 117D may generate sequence mapping data that identifies the corresponding sequence of bases of the obtained data packet. In some instances, executed sequencer engine 117D may add one or more primers, such as a front end primer and a back end primer, to the sequence mapping data. For instance, executed sequencer engine 117D may add a front end primer to the beginning of the sequence of bases associated with the data packet, and a back end primer to the end of the sequence of bases. Information related to the sequence of each of the one or more primers may be included in the metadata of each of the data blocks or segments. In various instances, the front end primer and the back end primer may be a fixed length or size known or encoded into executed sequencer engine 117D.

In other instances, executed sequencer engine 117D may determine whether a polynucleotide strand synthesized based on the sequence of bases identified in the sequence mapping data is stable enough to synthesize. In such instances, executed sequencer engine 117D may determine whether the sequence of bases identified in the sequence mapping data satisfies one or more sequence criterion. Examples of the one or more sequence criterion include, a criterion associated with repeated bases (e.g., number of bases in a row exceeds a threshold base amount), a criterion associated with patterns of the bases (e.g., sequence of bases should have a number of patterns below a threshold amount), and a criterion associated with the ratio of the bases (e.g., criterion indicate the ratio of bases should be 50/50 AT to GC). In examples where executed sequencer engine 117D determines the sequence of bases identified in the sequence mapping data satisfies the one or more sequence criterion, executed sequencer engine 117D may store the sequence mapping data in map data database 116.

In various instances, executed sequencer engine 117D may determine whether each data element of each data block has been included in sequence mapping data 308 of each data packet 306. In such instances, executed sequencer engine 117D may utilize metadata of each data block to determine whether each data element of each data block has been included in sequence mapping data 308 of each data packet 306 stored in map data database 116. In examples where executed sequencer engine 117D determines sequence mapping data 308 of each data packet 306 stored in map data database 116 is missing one or more data elements of one or more data blocks of the user data, such as user data 103, executed sequencer engine 117D may signal or instruct encoding engine 117C to continue encoding missing data elements of incomplete data blocks or segments. Otherwise, executed sequencer engine 117D may transmit sequence mapping data of each data packet to server 120A of genetic computing system 120. In such examples, executed sequencer engine 117D may generate message. Additionally, executed sequencer engine 117D may package within one or more portions of message sequence mapping data of each data packet. Moreover, executed sequencer engine 117D may transmit message including sequence mapping data of each data packet to server 120A of genetic computing system 120. As described herein, genetic computing system 120 may utilize sequence mapping data to generate a corresponding polynucleotide strand and store the corresponding polynucleotide strand in a pool of polynucleotide strands. The pool of poly nucleotides may include multiple polynucleotide strands that each correspond to a particular data block or segment of the user data.

In some examples, executed sequencer engine 117D may execute operations that determine a corresponding sequence of bits based on a sequence of bases of a particular polynucleotide strand. In such examples, genetic computing system 120 may process and sequence one or more polynucleotide strands in a pool of polynucleotide strands and generate sequence data identifying the sequence of bases of each of the polynucleotide strands. Additionally, genetic computing system 120 may transmit the sequence data to executed sequencer engine 117D. Executed sequencer engine 117D may determine a sequence of bits corresponding to the sequence of bases in the polynucleotide strand identified in the sequence data, based on mapping data obtained from map data database 116 and the sequence data. Additionally, executed sequencer engine 117D may generate sequenced bit data identifying the sequence of bits corresponding to the sequence of bases in the polynucleotide strand identified in the sequence data. In some instances, the polynucleotide strand may include primers, such as a front primer and/or an end primer that book end the fountain code seed and the payload. In such instances, the sequence of bases in the front primer and end primer are the same for each polynucleotide strand corresponding to a data packet. Such information, not illustrated in FIG. 1, may be obtained or already encoded into executed sequencer engine 117D, and may be utilized to identify and/or trim the primers from the sequence of the polynucleotide strand identified in sequence data generated by genetic computing system 120. In other instances, the polynucleotide strand may not include primers, such as a front primer and/or an end primer. In such instances, executed sequencer engine 117D may not need to identify and trim the primers from the sequence of the polynucleotide strand identified in sequence data generated by genetic computing system 120. In various instances, executed sequencer engine 117D may store the sequence data and the sequence bit data within one or more portions of data repository 111.

In other examples, the one or more processors of server 110A may execute a pre-flight engine to implement a set of pre-flight or pre-processing operations that determine an estimated distribution of data blocks or segments. In such examples, executed pre-flight engine may obtain, from map data database 116, sequence bit data associated with a random set of polynucleotide strands of the pool of polynucleotide strands (e.g., a set of 100,000-200,000 polynucleotide strands out of the pool of 10,000,000 polynucleotide strands). In some instances, the random set of polynucleotide strands may include primers, such as a front end primer and a back end primer. In such instances, executed pre-flight engine may determine the sequence of bits from the sequence bit data and identify portions of the sequence of bits corresponding to primers (herein described as "primer portions") based on information known or encoded into executed pre-flight engine associated with length and size of the primers. Moreover, executed pre-flight engine may identify portions of the sequence of bits that are between the primer portions and determine such portions as bits corresponding to the fountain code seed and associated payload and the size of such portions. Alternatively, in instances where the random set of polynucleotide strands does not include the primers, the executed pre-flight engine may not trim the sequence of bits corresponding to the random set of polynucleotide strands. In such instances, executed synthesis engine 121A may implement a biological protocol that uses a custom sequence primer which has the effect of removing either the front end primer and/or the back end primer of the polynucleotide sequences. As such, the remaining polynucleotide sequences may be sequenced by sequencer engine 121B and the corresponding sequence of bits generated by sequencer engine 117D may correspond to a fountain code seed portion and an associated payload portion.

Further, executed pre-flight engine may obtain, from decoded data database 115B, encoding-decoding parameters and determine which portion of the bits corresponding to the fountain code seed and associated payload is the fountain code seed and is the payload. For instance, the encoding-decoding parameters may indicate the corresponding data packet is formatted such that the fountain code seed is in front of the payload. Additionally, the encoding-decoding parameters may indicate the fountain code seed size and/or the payload size. Taken together, executed pre-flight engine may determine which portion of the bits corresponding to the fountain code seed and associated payload is the fountain code seed and is the payload based on the encoding-decoding parameters.

In examples where ED computing system 110 has encoded and decoded varying sizes of user data, the size of the bit sequence corresponding to the fountain code seed and the payload may vary. In such examples, not illustrated in FIG. 1, data packet mapping data may be stored in ED computing system 110. Data packet mapping data may at least indicate, for each varying size of bit sequence corresponding to the fountain code seed and the payload, a particular format (e.g., whether the fountain code seed is in front or behind the payload), and size of the fountain code seed and/or payload. Additionally, while executed pre-flight engine is implement the set of pre-flight or pre-processing operations, executed pre-flight engine executed pre-flight engine may determine the size of all the portions of the sequence of bits that are between the primer portions and determine the majority size. Based on the majority size and the data packet mapping data, executed pre-flight engine may determine the estimated fountain code seed size, the payload size, and which portions of the portions of sequence of bits that are between the primer portions correspond to the fountain code seed and which portions of the portions of sequence of bits that are between the primer portions correspond to the payload.

Referring back to FIG. 1, based on determining which portions of the sequence of bits may correspond to fountain code seed (herein described as the "fountain code seed portion"), executed pre-flight engine may determine, for each fountain code seed portion, an identifier of a data block. Further, executed pre-flight engine may determine the distribution of identifiers of data blocks based on the identifier of data block determined from each fountain code seed portion. In some instances, executed pre-flight engine may generate a histogram that identifies and characterizes the determined breakdown or makeup of the distribution of identifiers of data blocks. Additionally, or alternatively, executed pre-flight engine may generate data block plan data that identifies and characterizes the determined breakdown or make up of the distribution of identifiers of data blocks. In some instances, executed pre-flight engine may store the generate data block plan data within corresponding portions of data repository 111, such as decoded data database 115B.

Decoding engine 117E be executed by one or more processors of server 110A to decode encoded data packets. In some examples, executed decoding engine 117E may implement a set of operations to recover or generate seed metadata or metacode corresponding to each identified or determined portion of a sequence of bits associated with a second set of polynucleotide strands. In some examples, the second set of poly nucleotide strands may be all the polynucleotide strands that were sequenced. Additionally, executed decoding engine 117E may obtain, from map data database 116, sequence bit data associated with the second set of polynucleotide strands of the pool of polynucleotide strands. Based on the sequence bit data of the second set of polynucleotide strands, executed decoding engine 117E may determine a sequence of bits associated with the second set of polynucleotide strands. In instances where the second set of polynucleotide strands includes primers, such as a front end primer and a back end primer, executed decoding engine 117E may identify portions of the sequence of bits corresponding to primer portions based on information known or encoded into executed decoding engine 117E associated with length and size of the primers, and trim the primer portions. Each of the remaining portions may correspond to a fountain code seed portion and an associated payload portion. Alternatively, in instances where the second set of polynucleotide strands does not include the primers, executed decoding engine 117E may not trim the sequence of bits corresponding to the second set of polynucleotide strands. In such instances, executed synthesis engine 121A may implement a biological protocol that uses a custom sequence primer which has the effect of removing either the front end primer and/or the back end primer of the polynucleotide sequences. As such, the remaining polynucleotide sequences may be sequenced by sequencer engine 121B and the corresponding sequence of bits generated by sequencer engine 117D may correspond to a fountain code seed portion and an associated payload portion. Moreover, executed decoding engine 117E may obtain, from decoded data database 115B, encoding-decoding parameters and determine which portion of the remaining portion is a fountain code seed portion and which portion of the remaining portion is a payload portion.

In some examples, executed decoding engine 117E may determine, for each fountain code seed portion, an identifier of a corresponding data block. Additionally, executed decoding engine 117E may determine a distribution of the identifiers of data blocks associated with the second set of polynucleotide strands based on the determined identifier of a corresponding data block for each fountain code seed portion. In such examples, executed decoding engine 117E may determine whether the distribution of the identifiers of the data blocks associated with the second set of polynucleotide strands matches the distribution of the identifiers of the data blocks identified in data block plan data. In examples where the distribution of the identifiers of the data blocks associated with the second set of polynucleotide strands do not match the distribution of the identifiers of the data blocks identified in data block plan data, executed decoding engine 117E may implement additional recovery operations using clustering, multiple read alignment and majority base calling. In some instances, based on the distribution of the identifiers of the data blocks associated with the second set of polynucleotide strands not matching the distribution of the identifiers of the data blocks identified in data block plan data, executed decoding engine 117E may determine an identifier of a data block is missing or in error in the second set of polynucleotide strands or from the data block plan data. In such instances, executed decoding engine 117E may implement additional recovery operations using clustering, multiple read alignment and majority base calling for such missing data blocks.

In examples where the distribution of the identifiers of the data blocks associated with the second set of polynucleotide strands matches the distribution of the identifiers of the data blocks identified in data block plan data, executed decoding engine 117E may sort each portion of bits corresponding to the fountain code seed and associated portion of bits corresponding to the payload by the identifier of corresponding data block. Additionally, executed decoding engine 117E may generate list data identifying and characterizing, for each identifier of each of the data blocks or segments, a sequence of bits of each of the fountain code seed portion and associated payload portions. In some instances, executed decoding engine 117E may store the list data within portions of data repository 111, such as decoded data database 115B.

Moreover, executed decoding engine 117E may generate or recover seed metadata or metacode associated with each fountain code seed portion and the payload portion of each identifier of a data block. In some examples, executed decoding engine 117E similar to executed FC seed engine 117B, may, for each identifier of a data block, apply one or more mixing functions mixing function to each fountain code seed portion to generate a corresponding seed metadata or metacode. As described herein, examples of a mixing function may include, a mixing function that when applied to each fountain code seed portion causes executed decoding engine 117E to generate a corresponding data block or segment identifier. The data block or segment identifier may identify a corresponding data block or segment associated with the random set of data elements identified in the corresponding fountain code seed portion. Additionally, another example of a mixing function may include, a mixing function that when applied to each fountain code seed portion causes executed decoding engine 117E to generate for each identified data element in the set of random values identified in the corresponding fountain code seed portion, a value representing one of multiple possible states the corresponding data element can take on (e.g., "isZero," "isOne," "noInfo"). Moreover, yet another example of a mixing function may include a mixing function that when applied to each fountain code seed portion causes executed decoding engine 117E to generate, for each identified data element in the set of random values identified in the corresponding fountain code seed portion, a value representing the corresponding metadata bit. In some instances, the value representing the corresponding metadata bit may indicate to executed decoding engine 117E, which generated value representing one of multiple states is associated with which data element. In other instances, the value may be between zero and the metadata size minus one. In other instances, executed decoding engine 117E may generate seed metadata or meta code of each fountain code seed portion based on the corresponding data block or segment identifier, one or more values that each represent a metadata bit and associated value representing one of multiple states. The seed metadata or metacode of each of fountain code seed portion may identify and characterize the corresponding data block or segment identifier, one or more values that each represent a metadata bit and associated value representing one of multiple states. In such instances, executed decoding engine 115E may store the seed metadata or metacode within portions of data repository 111, such as decoded data database 115B.

In some examples, executed decoding engine 117E may determine whether, for each identifier of a data block or segment, a corresponding seed metadata or metacode of each corresponding fountain code seed portion is consistent with one another. In such examples, executed decoding engine 117E may utilize one or more confidence thresholds to determine whether, for each identifier of a data block or segment, a seed metadata or metacode of each corresponding fountain code seed portion is consistent with one another. In some instances, the one or more confidence thresholds may be associated with a number of fountain code seed portions with a metadata bit of a particular value having a particular value that represents a particular state of the multiple states. For instance, for a first data block, executed decoding engine 117E may obtain seed metadata of 750 fountain code seed portions associated with an identifier of the first data block. Additionally, based on the seed metadata of 750 fountain code seed portions, executed decoding engine 117E may determine that 500 of the fountain code seed portion has a corresponding seed metadata that indicates for a metadata bit with a particular value of 1 (e.g., metadata bit 1) has a corresponding value representing a particular state of multiple states of "isZero." Executed decoding engine 117E may determine whether the metadata bit with the value of 1 of first data block has a corresponding value representing the state of "isZero," based on whether the number of fountain code seed portions with seed metadata having a metadata bit with the value of 1 that has a corresponding value representing the state of "isZero" is above or equal a confidence threshold associated with a number of metadata bit of a particular value having a particular value that represents a particular state of the multiple states. In instances, where the confidence threshold is 250 fountain code seed portions with seed metadata with a metadata bit value of 1 of first data block with a corresponding value representing the state of "isZero," executed decoding engine 117E may determine the metadata bit with the value of 1 of first data block has a corresponding value representing the state of "isZero." Alternatively, in instances where the confidence threshold is 5000 seed metadata or metacode with a metadata bit value of 1 of first data block with a corresponding value representing the state of "isZero, executed decoding engine 117E may determine the metadata bit with the value of 1 of first data block may not have a corresponding value representing the state of "isZero" or has a state of "isNoInfo."

In other instances, the one or more confidence thresholds may be based on, for a particular data block, the most number of metadata bit of a particular value with a particular value that represent a particular state of multiple states. For instance, for a second data block, executed decoding engine 117E may obtain seed metadata of a number of fountain code seed portions. Based on the obtained seed metadata, executed decoding engine 117E may determine that 100 fountain code seed portions has a corresponding seed metadata that indicates for a metadata bit with a particular value of 3 (e.g., metadata bit 3) has a corresponding value representing a particular state of multiple states of "isZero," and 350 fountain code seed portions has a corresponding seed metadata that indicates for a metadata bit with a particular value of 3 (e.g., metadata bit 3) has a corresponding value representing a particular state of multiple states of "isOne." Moreover, executed decoding engine 117E may determine the metadata bit with the value of 3 of second data block has a corresponding value representing the state of "isZero" based on the number of fountain code seed portions has a corresponding seed metadata that indicates for a metadata bit with a particular value of 3 (e.g., metadata bit 3) has a corresponding value representing a particular state of multiple states of "isZero," compared to the number of fountain code seed portions has a corresponding seed metadata that indicates for a metadata bit with a particular value of 3 (e.g., metadata bit 3) has a corresponding value representing a particular state of multiple states of "isOne."

In other examples, executed decoding engine 117E may determine whether, for each identifier of a data block or segment, the payload portion is sufficient to enable executed decoding engine 117E to recover a complete corresponding data block. In some instances, executed decoding engine 117E may make such determinations based on the seed metadata or metacode of each of the corresponding fountain code seed portions. In such instances, executed decoding engine 117E may determine which data elements of the corresponding data block is identified in the seed metadata of each corresponding fountain code seed portions. Additionally, based in part on the identified data elements, executed decoding engine 117E may determine whether any and which data elements of the corresponding data block is missing or incorrect. For instance, executed decoding engine 117E may determine which data elements is missing or incorrect by comparing the identified data elements of each fountain code seed portion. For example, executed decoding engine 117E may determine all or the majority of the identified data elements that have a metabit value of 1 have a corresponding value associated with a state "isOne." Additionally, executed decoding engine 117E may determine a minority number of identified data elements that have a metabit value of 1 have a corresponding value associated with a state of "isZero." As such, executed decoding engine 117E may determine the data element that has a metabit value of 1 may have a corresponding value associated with a state of "IsOne," and those identified with "isZero," is incorrect. In another example, executed decoding engine 117E may determine one or more of the identified data elements that have a metabit value of 2 but no information is obtained regarding a corresponding value associated with a state of multiple states. Additionally, executed decoding engine 117E may determine a number of identified data elements that have a metabit value of 2 have a corresponding value associated with a state of "isZero." As such, executed decoding engine 117E may determine the data elements that have a metabit value of 2 with missing values associated with a state, may have a corresponding value associated with a state of "isZero."

Otherwise, in examples where executed decoding engine 117E determines all data elements are identified in the seed metadata or metacode of fountain code seed portions for each data block, executed decoding engine 117E may perform a set of operations to rebuild the original user data based on the list data and the seed metadata or metacode of each portion of bits corresponding to fountain seed code of the identifier of each data block or segment. In some examples, executed decoding engine 117E may obtain, from decoded data database 115B, list data and seed metadata of fountain code seed portions of each data block. Additionally, executed decoding engine 117E may utilize the list data and the seed metadata or metacode to initialize a decoding process, such as a fountain code decoding process. In some instances, executed decoding engine 117E may implement the decoding process to decode each data block in series or simultaneously/in-parallel. In either instances, for each data block, executed decoding engine 117E may apply the decoding process to the seed metadata and portions of the list data associated with an identifier of the corresponding data block. Additionally, for each data block, executed decoding engine 117E may generate sets of data elements from each payload portion based on the application of the decoding process to the seed metadata and portions of the list data associated with the identifier of the corresponding data block. As described herein, the list data may identify for each data block and identifier of the data block, payload portions obtained from the sequence of bits. Moreover, for each data block, executed decoding engine 117E may identify information of each data element within each set of data elements. For instance, for each data block, executed decoding engine 117E may identify a metadata bit value associated with each data element of each set, and corresponding information to be passed, such as a state of multiple states (e.g., "isZero," "isOne," "isnoInfo"). Additionally, for each data block, executed decoding engine 117E may determine the order of the data elements that reflects the data elements of each block of the user data when originally received and segmented by ED computing system 110 (e.g., executed segmenting engine 117A). The order of the data elements is based in part on the seed metadata and portions of the list data associated with the identifier of the corresponding data block. In some instances, executed decoding engine 117E may utilize a connection graph to determine the connections between each data element of a particular data block and the order of the data elements.

In some instances, executed decoding engine 117E may determine whether all data elements of a particular data block have been identified, whether the corresponding values representing one of multiple states has been determined, and whether the order of the data elements has been determined. As described herein, executed decoding engine 117E may make such determinations for each data block identified in the sequence of bits. In instances where executed decoding engine 117E has determined all data elements of a particular data block have been identified, the corresponding values representing one of multiple states have been determined, and the order of the data elements has been determined, executed decoding engine 117E may rebuild the particular data block from corresponding portions of bits corresponding to the payload and in accordance with the seed metadata, the portions of the list data associated with the identifier of the corresponding data block, and the determined corresponding order of data elements. In such instances, executed decoding engine 117E may rebuild the particular block data by building each data element from and identified in the portions of bits corresponding to the payload and combine each data element in the order according to the determined corresponding order of data elements. After each data block identified from the sequence of bits has been built, executed decoding engine 117E may combine each built data block. The combined data block may reflect the original user data received by ED computing system 110. In some instances, executed decoding engine 117E may store the combined data block and each individually built data block within corresponding portions of data repository 111, such as decoded data database 115B. In other instances, executed decoding engine 117E may generate a message and package within one or more portions of the message the rebuilt user data. In such instances, executed decoding engine 117E may transmit the message and included rebuilt user data back to a client device 101 of a user that originally sent the original user data that the rebuilt user data is based off of.

In various instances, building the particular data block may also produce the metadata of the particular data block. In such instances, executed decoding engine 117E may determine a hash value included in the metadata of the particular data block. Additionally, executed decoding engine 117E may determine whether the information included in the hash value matches the data of the particular data block (e.g., whether a portion of the hash value corresponding to a data block identifier matches a data block identifier included in the particular data block). In instances where executed decoding engine 117E determines the information included in the hash value matches the data of the particular data block, executed decoding engine 117E may determine the particular data block may be combined with other data blocks also determined to have corresponding hash values that have information that matches the data of the corresponding data block. In instances where executed decoding engine 117E determines the information included in the hash value does not match the data of the particular data block, executed decoding engine 117E may determine the particular data block may be corrupted. In such instances, executed decoding engine 117E may implement operations to identify and replace the corruption within the particular data block. For instance, executed decoding engine 117E may identify all the data elements of particular data blocks that may have erroneous or incorrect data (e.g., values of a particular state of a particular bit value of a group of fountain code portions that are not consistent with the values of the particular state of the particular bit value other fountain code portions). Additionally, executed decoding engine 117E may utilize clustering, multiple read alignments and/or majority bass calling processes to recover data that may be correct for such identified data elements of particular blocks that may have erroneous or incorrect data. As described herein, executed encoding engine 117C may generate additional data packages with redundant sets of random data elements. As such, the pool of polynucleotide strands may include polynucleotide strands associated with redundant sets of random data elements that when sequenced and converted to a sequence of bits, may be utilized to determine, identify and replace the corruption within the particular data block.

Referring back to FIG. 1, genetic computing system 120 may be operated by one or more operators. Additionally, genetic computing system 120 may represent a computing system that includes one or more servers, such as server 120A, and one or more tangible, non-transitory memory devices storing executable code, application engines, or application modules. Each of the one or more servers may include one or more processors, which may be configured to execute portions of the stored code, application engines or modules, or application programs to perform operations consistent with the disclosed exemplary embodiments. For example, as illustrated in FIG. 1, the one or more servers of genetic computing system 120 may include server 120A having one or more processors configured to execute portions of the stored code, application engines or modules, or application programs maintained within the one or more tangible, non-transitory memories.

Further, as described herein, genetic computing system 120 may execute processes, as described herein, to generate or synthesize polynucleotides corresponding to a data packet generated by ED computing system 110. To facilitate the performance of generating or synthesizing polynucleotides corresponding to a data packet generated by ED computing system 110, genetic computing system 120, may maintain within the one or more tangible, non-transitory memories, such as application repository 121. Application repository 121 may include, among other things, synthesis engine 121A and sequencer engine 121B. Synthesis engine 121A may be executed by one or more processors of server 120A to obtain, from ED computing system 110 sequence mapping. As described herein sequence mapping data may identify and characterize a sequence of bases corresponding to each data packet that includes a random set of data elements associated with one of the data blocks of user data. In some instances, the sequence mapping data may include one or more primers. Additionally, executed synthesis engine 121A may generate instructions and package within one or more portions of the instructions the sequence mapping data. Moreover, executed synthesis engine 121A may transmit the instructions to electrode unit 122. Electrode unit 122 may include one or more electrodes configured to generate or synthesize a corresponding polynucleotide strand based on the instructions. As described herein, genetic computing system 120 may store the poly nucleotide strand in a polynucleotide pool. The polynucleotide pool and the polynucleotide strand may be associated with the same user data the polynucleotide pool and strand are derived from.

Moreover, sequencer engine 121B may be executed by one or more processors of server 120A to sequence one or more polynucleotide strands from a polynucleotide pool. In some examples, executed sequencer engine 121B may communicate with one or more electrodes of electrode unit 122 to sequence one or more polynucleotides that are being detected and measured/sequenced by the one or more electrodes of electrode unit 122. Additionally, executed sequencer engine 121B may generate sequence data identifying the sequence of bases in the detected and measured/sequenced one or more polynucleotides. Moreover, executed sequencer engine 121B may transmit the sequence data to ED computing system 110. As described herein, ED computing system 110 may rebuild user data associated with the sequence data. In some instances, ED computing system 110 and genetic computing system 120 may be combined. In other instances, ED computing system 110 and genetic computing system 120, as illustrated in FIG. 1, may be discrete computing systems.

Figure 2:
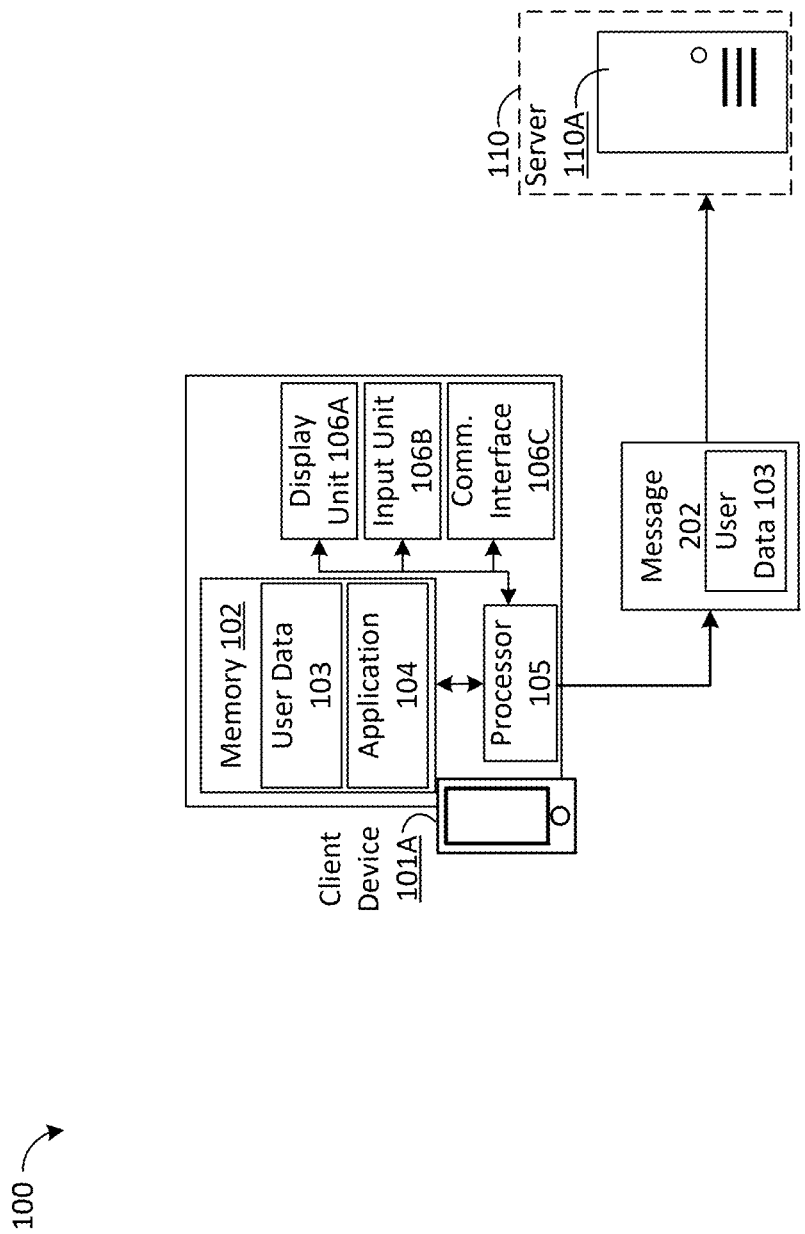
FIGS. 2-6 are block diagrams illustrating a portion of an exemplary computing environment, in accordance with some exemplary embodiments.

B. Computer-Implemented Techniques for Encoding User Data into Polynucleotide Strands As described herein, encoder-decoder (ED) computing system 110 may implement operations that encode data for storage in genetic materials, such as one or more polynucleotide strands. Additionally, ED computing system 110 may utilize fountain code (FC) process to encode such data. Data that ED computing system 110 may encode, may be obtained from one or more client devices 101, such as client device 101A. In some examples, as illustrated in FIG. 2, client device 101A or any client device 101, such as client device 101B and/or client device 101C, may transmit corresponding user data to ED computing system 110. For instance, as illustrated in FIG. 2, processor 105 of client device 101A may obtain user data 103. Additionally, processor 105 may generate message 202 and package within one or more portions of processor 105, user data 103. Processor 105 may transmit message 202, along with user data 103, to server 110A of ED computing system 110.

Figure 3:
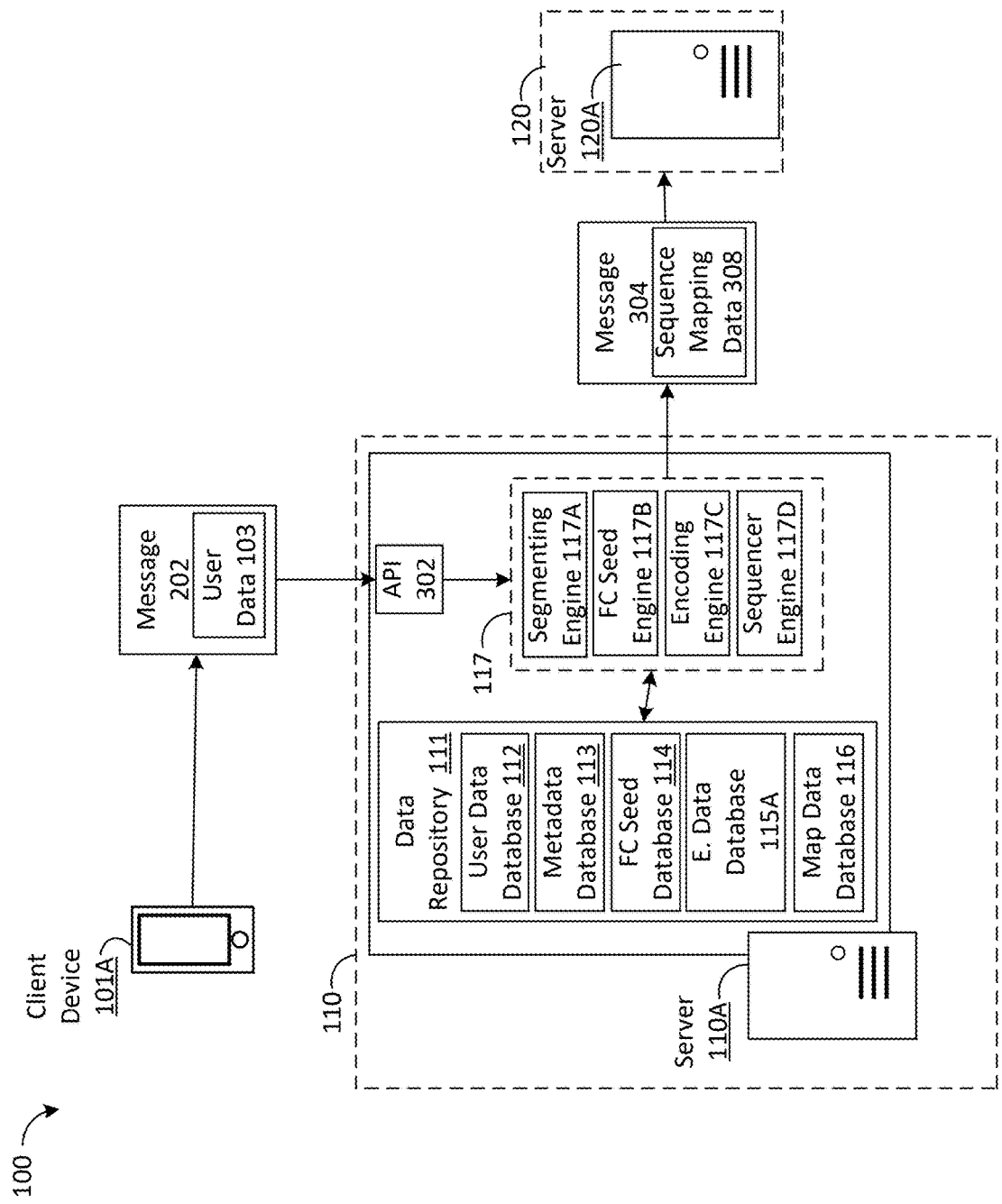

As illustrated in FIG. 3, a programmatic interface established and maintained by server 110A of ED computing system 110, such as application programming interface (API) 302, may receive message 202 that includes user data 103. As described herein, ED computing system 110 may receive message 202 across communications network 130 via a channel of communications established programmatically between API 302 and processor 105 or any processor of client device 101, such as client device 101A, client device 101B and/or client device 101C. Moreover, API 302 may route message 202 to executed segmenting engine 117A. Executed segmenting engine 117A may parse message 202 and obtain user data 103. Further, executed segmenting engine 117A may store user data 103 within a corresponding portion of data repository 111, such as user data database 112.

As described herein, executed segmenting engine 117A may perform operations that segment user data 103 into multiple segments or data blocks. In some examples, executed segmenting engine 117A may segment the user data into multiple (e.g., 4 to 2048) smaller data blocks of roughly equal non-overlapping size. In some instances, executed segmenting engine 117A may generate store the one or more segments or data blocks within corresponding portions of data repository 111, such as user data database 112. Additionally, executed segmenting engine 117A may generate, for each of the multiple data blocks, metadata. As described herein the metadata of a particular data block may identify and characterize information about the corresponding data block. Examples of information about the corresponding data block includes, an identifier associated with a corresponding segment or data block (e.g., block identifier), an identifier or value, such as a metabit value associated with each data element included in the corresponding data block (e.g., bit identifier), information or value associated with each data element (e.g., "isZero," "isOne," or "noInfo."), and a hash value identifying and characterizing information of the corresponding segment or data block (e.g., a hash value corresponding to a data block identifier). In some instances, the metadata may include encoding-decoding information that characterizes and identifies a number of encoding-decoding parameters. Each encoding-decoding parameter may characterize a characteristic of the encoding and decoding process used for the received user data, such as the one or more segments or data blocks. In other instances, the encoding-decoding parameters may be based in part and depend on the size of the received or obtained user data. In various instances, executed segmenting engine 117A may generate store metadata of each of the multiple data blocks within corresponding portions of data repository 111, such as metadata database 113.

Additionally, as illustrated in FIG. 3, executed fountain code (FC) seed engine 117B may implement operations to generate seed data. As described herein, the seed data may identify and characterize a number of fountain code seeds. In some examples, executed FC seed engine 117B may implement a random generator process to generate each of the fountain code seeds included in the seed data. In some instances, each of the fountain code seeds may include a set or fixed number of random values, such as 26 to 32 bits. In other instances, executed FC seed engine 117B may generate a fountain code seed based on the size of the user data. For instance, executed FC seed engine 117B may obtain, from user data database 112 the data blocks of user data 103 or prior to segmentation, user data 103. Additionally, executed FC seed engine 117B may determine a size of user data 103 based on the data blocks of user data 103 or user data 103 itself. Moreover, executed FC seed engine 117B may generate a fountain code seed corresponding to the determined size of user data 103 (e.g., larger the size of the user data, the larger the size of the fountain code seed). In various instances, the fountain code seed generated by executed FC seed engine 117B may correspond to a particular data block and a set of data elements associated with the particular data block. In such instances, the set of random values included in a fountain code seed may identify the particular data block, a number of data elements included in the set of data elements associated with the particular data block, and which of the data elements are to be included in the set of data elements of the particular block. Additionally, executed FC seed engine 117B may generate such fountain code seed based on portions of metadata stored in metadata database 113 associated with the particular block. As described herein, the fountain code seed may include information sufficient to describe contents of a corresponding data packet that ED computing system 110 may use when decoding the corresponding data packet. In some instances, executed FC seed engine 117B may generate seed data that includes one or more fountain code seed generated by executed FC seed engine 117B.

Moreover, executed FC seed engine 117B may embed or include within the fountain code seeds, portions of the metadata stored in metadata database 113 that characterizes and identifies a number of encoding-decoding parameters. In some examples, executed FC seed engine 117B may, for each data block of a user data, such as user data 103, obtain corresponding metadata from metadata database 113. Additionally, the corresponding metadata of each of the data blocks of the user data may include encoding-decoding parameters. As described herein, each encoding-decoding parameter may characterize a characteristic of the encoding and decoding process used for the received user data, such as the one or more data blocks. Additionally, the encoding-decoding parameters may be based in part and depend on the size of the received or obtained user data, such as user data 103.

Additionally, executed FC seed engine 117B may, for each of one or more fountain code seeds, generate a corresponding seed metadata or metacode. In such instances, for each of the one or more fountain code seeds, executed FC seed engine 117B may apply one or more mix functions to the corresponding fountain code seed to generate the corresponding seed metadata. As described herein, the one more mixing functions may be deterministic-producing the same result for a specific data packet, no matter what order the data packets are processed, not be biased and may have a very flat distribution over the entire set of results. In some instances, each of the one or more mixing functions may include a set of xor-shift functions configured for long cycle pseudo-random number generation.

In some examples, the one or more mixing functions may include, a mixing function that when applied to a fountain code seed causes executed FC seed engine 117B to generate a data block identifier associated with a valid data block. The data block identifier may identify the data block a corresponding fountain code seed is associated with. In some instances, the mixing function may generate the data block identifier based on the values of the fountain code seed and the size of the fountain code seed. In other examples, the one or more mixing functions may include, a mixing function that when applied to a fountain code seed causes executed FC seed engine 117B to generate, for each identified data element in the set of random values included in the fountain code seed, a value representing one of multiple possible states the corresponding data element can take on (e.g., "isZero," "isOne," "noInfo"). In various examples, the one or more mixing functions may include, a mixing function that when applied to a fountain code seed causes executed FC seed engine 117B to generate, for each data element identified in the set of random values included in the fountain code seed, a value representing a corresponding metadata bit.

Referring back to FIG. 3, executed FC seed engine 117B may generate, for each fountain code seed, seed metadata based in part on the outputs of each of the one or more mixing functions. For instance, the seed metadata may include the corresponding data block identifier, for each of the data elements included in the corresponding data block, a corresponding value representing a metadata bit and a corresponding value representing one of multiple states. In some instances, executed FC seed engine 117B may store, the seed data and the seed metadata of each fountain code seed included in the seed data within corresponding portions of data repository 111, such as FC seed database 114.

By way of example, a first mixing function may be configured to generate a data block identifier associated with a valid data block, a second mixing function may be configured to generate, for each identified data element in the set of random values included in the fountain code seed, a value representing one of multiple possible states the corresponding data element can take on (e.g., "isZero," "isOne," "noInfo"), and a third mixing function may be configured to generate, for each identified data element in the set of random values included in the fountain code seed, a value representing the corresponding metadata bit. In such an example, executed FC seed engine 117B may obtain seed data and apply the first mixing function, the second mixing function and the third mixing function to a particular fountain code seed (e.g., 24-32 bit) of the seed data. Additionally, based on the application of the first mixing function to the particular fountain code seed, executed FC seed engine 117B may generate a 2-11 bit data block identifier that represents a particular data block associated with the particular fountain code seed. Moreover, based on the application of the second mixing function to the particular fountain code seed, executed FC seed engine 117B may generate a value, such as "isZero," "isOne," "noInfo," associated with each element identified in the particular fountain code seed. Further, based on the application of the third mixing function to the particular fountain code seed and for each of the elements identified in the particular fountain code seed, executed FC seed engine 117B may generate a value that represents the specific metadata bit.

Referring back to FIG. 3, executed encoding engine 117C may utilize seed data and seed metadata to encode user data, such as user data 103 obtained from one or more client devices 101. As described herein, executed encoding engine 117C may encode each data block of the user data. In such examples, executed encoding engine 117C may encode the data blocks of the user data simultaneously or in parallel, or alternatively in series. Additionally, executed encoding engine 117C may, for each data block, apply a fountain code (e.g., a Luby Transform) to each data element of each corresponding data block. Moreover, executed encoding engine 117C may generate and package into one or more portions of a data packet a random set of data elements. Further, executed encoding engine 117C may combine the random set of data elements together, bitwise, under a binary field. The combined random set of data elements may be the payload of the corresponding data package and may include information necessary to describe the original user data when processed, such as decoded, with a sufficient number of other data packets.

For example, executed encoding engine 117C may obtain metadata of each data block of user data 103 obtained from one or more client devices 101, such as client device 101A. Additionally, executed encoding engine 117C may obtain, from FC seed database 114, seed data and corresponding seed metadata. Moreover, for each data block, executed encoding engine 117C may select a particular potential fountain code seed from the obtained seed data. Based on the corresponding seed metadata of the potential fountain code seed and metadata associated with the corresponding data block, executed encoding engine 117C may determine whether the identifier identified in the metadata of the corresponding data block matches the data block identifier of the seed metadata. In examples where executed encoding engine 117C determines the identifier identified in the metadata of the corresponding data block does not match the data block identifier of the seed metadata, executed encoding engine 117C may select another potential fountain code seed. Additionally, executed encoding engine 117C may repeat the process of determining whether the identifier identified in the metadata of the corresponding data block matches the data block identifier of the seed metadata of the second potential fountain code seed. Executed encoding engine 117C may keep repeating the process until the data block identifier of a potential fountain code matches the identifier identified in the metadata of the corresponding data block.

In examples where executed encoding engine 117C determines the identifier identified in the metadata of the corresponding data block or segment matches the data block identifier of the seed metadata, executed encoding engine 117C may determine whether the potential fountain code seed has been utilized to generate another data packet of a random set of data elements. In examples where executed encoding engine 117C determines the fountain code seed has been utilized to generate another data packet of a random set of data elements, executed encoding engine 117C may select another potential fountain code seed from the seed data. As described herein, executed encoding engine 117C may repeat the above described processes to determine a potential fountain code seed that includes a data block identifier that matches the identifier identified in the metadata of the corresponding data block and that hasn't been utilized to generate another data packet of a random set of data elements.

In examples where executed encoding engine 117C determines the potential fountain code seed has not been utilized to generate another data packet of a random set of data elements, executed encoding engine 117C may determine whether the one or more values that represent in the corresponding metadata bit in the seed metadata and corresponding value that represents one of multiple states (e.g., "isZero," "isOne," "noInfo") are identified in the metadata of the corresponding block data. In examples where executed encoding engine 117C determines the one or more values that represent in the corresponding metadata bit in the seed metadata and corresponding value that represents one of multiple states are not identified in the metadata of the corresponding block data, executed encoding engine 117C may select another potential fountain code seed. As described herein, executed encoding engine 117C may repeat the above described processes to determine a potential fountain code seed that (1) includes a data block identifier that matches the identifier identified in the metadata of the corresponding data block, (2) that hasn't been utilized to generate another data packet of a random set of data elements, and (3) includes one or more values that represent in the corresponding metadata bit in the seed metadata and corresponding value that represents one of multiple states (e.g., "isZero," "isOne," "noInfo") are identified in the metadata of the corresponding block data.

In examples where executed encoding engine 117C determines the one or more values that represent in the corresponding metadata bit in the seed metadata and corresponding value that represents one of multiple states are identified in the metadata of the corresponding block data or segment, executed encoding engine 117C may utilize the potential fountain code seed and/or corresponding seed metadata to generate data packet 306 with a payload corresponding to the potential fountain code seed. For example, the payload may include the set of random data elements identified in the potential fountain code seed and/or corresponding seed metadata. Additionally, as described herein, each data element of the set of random data elements may be encoded, by executed encoding engine 117C, using fountain code (e.g., a Luby Transform). In some instances, executed encoding engine 117C may combine each of the encoded data elements of the set of random data elements and package the combined encoded data elements into one or more portions of data packet 306. Moreover, as described herein, executed encoding engine 117C may package into one or more portions of the data packet 306, the corresponding potential fountain code seed. As described herein, executed encoding engine 117C may, for each data block identified in the metadata, repeat the processes as described herein until all the data elements identified in the metadata of a corresponding data block are included in data packets 306. In some instances, executed encoding engine 117C may, for each data block of user data 103, store the generated data packet 306 within corresponding portions of data repository 111, such as encoded data database 115A.

In some instances, executed encoding engine 117C may add an error correction code (ECC) in the data packet. The ECC may be utilized by ED computing system 110 to control errors in the corresponding data packet during the decoding process (e.g., utilized to recover missing bits during the decoding process or correct erroneous bits). In some, instances the encoding-decoding parameters may indicate the corresponding data packet is formatted such that the ECC is behind the payload. In such instances, based on the encoding-decoding parameters, executed encoding engine 117C may generate a data packet with an ECC code behind the payload.

As described herein, executed sequencer engine 117D may generate sequence mapping data for each of data packet 306 of user data 103 stored in encoded data database 115A. For example, as illustrated in FIG. 3, executed sequencer engine 117D may obtain mapping data from map data database 116. As described herein, mapping data may identify a particular base and corresponding bit pair. The mapping data may be modified and generated by an operator of ED computing system 110. Examples of bit pair and corresponding base may include bit pair 00 corresponds to adenine, bit pair 01 corresponds to cytosine, bit pair 10 corresponds to guanine, and bit pair 11 corresponds to thymine. Additionally, executed sequencer engine 117D may obtain, one or more data packets 306 of user data 103 stored in encoded data database 115A. Moreover, for each of the one or more data packets 306, executed sequencer engine 117D may identify or determine the sequence of bits of the fountain code seed and the payload (e.g., the encoded random set of data elements) included in the corresponding data packet 306. Based on the determined or identified sequence of bits of each of the one or more data packets 306 and the mapping data, executed sequencer engine 117D may determine a corresponding sequence of bases for the sequence of bits of each of the one or more data packets 306. Further, for each of the one or more data packets 306 and based on the determined corresponding sequence of bases, executed sequencer engine 117D may generate sequence mapping data 308. Sequence mapping data 308 of each of the one or more data packets 306, may identify the corresponding sequence of bases of the corresponding data packet 306.

In some instances, executed sequencer engine 117D may add one or more primers or portions of sequences representing a corresponding primer, such as a front end primer and a back end primer, to the sequence mapping data of each of the one or more data packets 306. For instance, for a particular data packet 306, executed sequencer engine 117D may add a sequence of bases representing a front end primer to the beginning of the corresponding sequence of bases. Additionally, for the particular data packet 306, executed sequencer engine 117D may add a sequence of bases representing a back end primer to the end of the corresponding sequence of bases. Information related to the sequence of each of the one or more primers may be included in the metadata of each of the data blocks or segments. In various instances, the front end primer and the back end primer may be a fixed length or size known or encoded into executed sequencer engine 117D.

In other instances, for the sequence mapping data 308 of each data packet 306, executed sequencer engine 117D may determine whether a polynucleotide synthesized from a corresponding sequence of bases identified in the associated sequence mapping data is stable enough to synthesize. In such instances, for the sequence mapping data 308 of each data packet 306, executed sequencer engine 117D may determine whether the sequence of bases in the corresponding sequence mapping data 308 satisfies one or more sequence criterion. Examples of the one or more sequence criterion include, a criterion associated with repeated bases (e.g., number of bases in a row exceeds a threshold base amount), a criterion associated with patterns of the bases (e.g., sequence of bases should have a number of patterns below a threshold amount), and a criterion associated with the ratio of the bases (e.g., criterion indicate the ratio of bases should be 50/50 AT to GC). In examples where executed sequencer engine 117D determines the sequence of bases of sequence mapping data 308 of a particular data packet 306 satisfies the one or more sequence criterion, executed sequencer engine 117D may store the sequence mapping data 308 in map data database 116.

In various instances, executed sequencer engine 117D may determine whether each data element of each data block has been included in sequence mapping data 308 of each data packet 306. In such instances, executed sequencer engine 117D may utilize metadata of each data block to determine whether each data element of each data block has been included in sequence mapping data 308 of each data packet 306 stored in map data database 116. In examples where executed sequencer engine 117D determines sequence mapping data 308 of each data packet 306 stored in map data database 116 is missing one or more data elements of one or more data blocks of the user data, such as user data 103, executed sequencer engine 117D may signal or instruct encoding engine 117C to continue encoding missing data elements of incomplete data blocks or segments. Otherwise, executed sequencer engine 117D may transmit sequence mapping data 308 of each data packet 306 to server 120A of genetic computing system 120. In such examples, executed sequencer engine 117D may generate message 304. Additionally, executed sequencer engine 117D may package within one or more portions of message 304 sequence mapping data 308 of each data packet 306. Moreover, executed sequencer engine 117D may transmit message 304 including sequence mapping data 308 of each data packet 306 to server 120A of genetic computing system 120. As described herein, genetic computing system 120 may utilize sequence mapping data 308 to generate a corresponding polynucleotide strand and store the corresponding polynucleotide strand in a pool of polynucleotide strands. The pool of poly nucleotides may include multiple polynucleotide strands that each correspond to a particular data block or segment of the user data.

Figure 4:
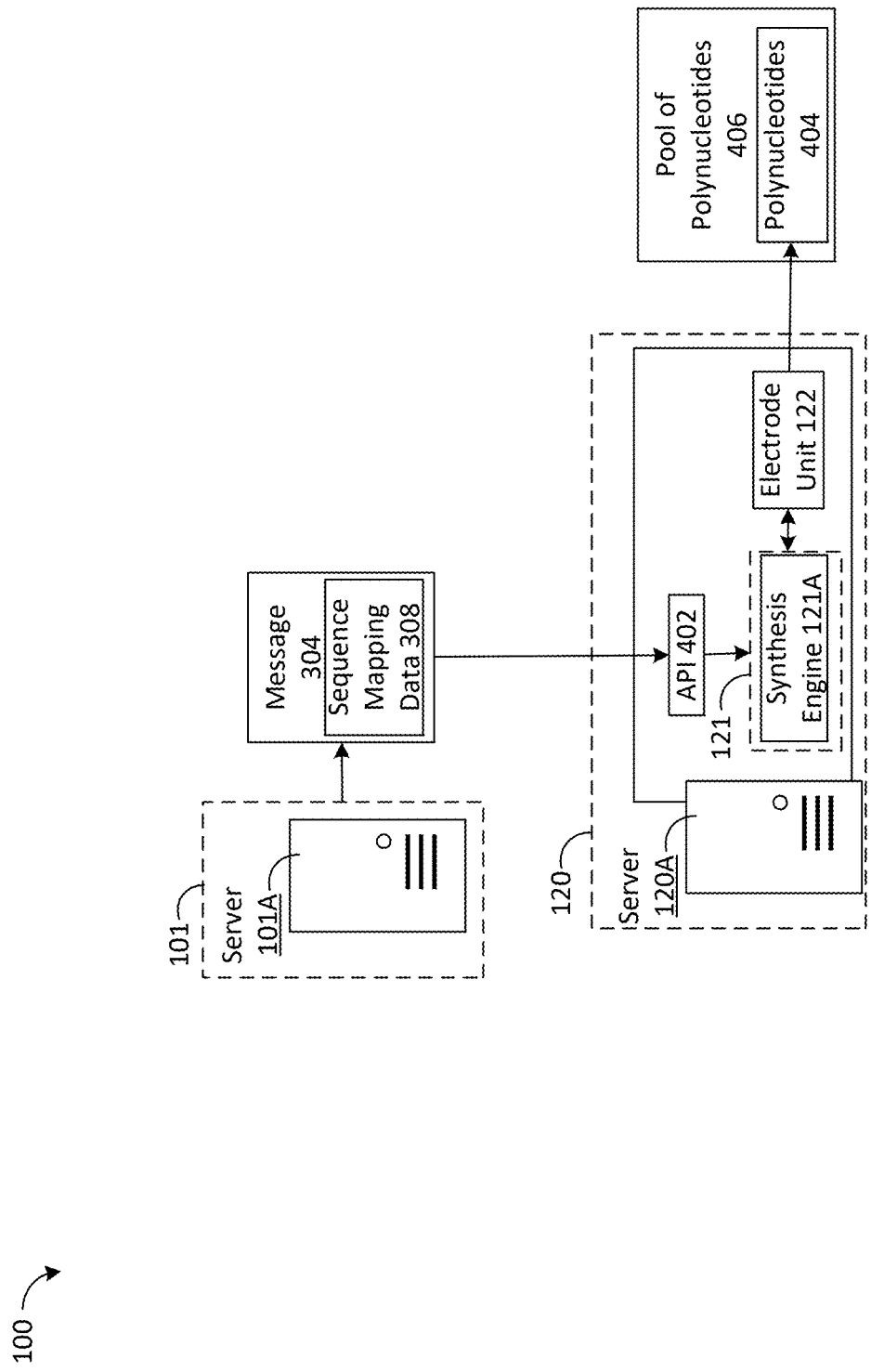

As illustrated in FIG. 4, a programmatic interface established and maintained by server 120A of genetic computing system 120, such as API 402, may receive message 304 that includes sequence mapping data 308 of each data packet 306. As described herein, genetic computing system 120 may receive message 304 across communications network 130 via a channel of communications established programmatically between API 402 and executed sequencer engine 117D. Moreover, API 402 may route message 304 to executed synthesis engine 121A. Executed synthesis engine 121A may parse message 304 and obtain sequence mapping data 308 of each data packet 306. Further, executed segmenting engine 117A may provide sequence mapping data 308 to one or more electrodes of electrode unit 122. The one or more electrodes of electrode unit 122 may generate a corresponding polynucleotide strand 404 for each sequence of bases identified in the sequence mapping data 308 of each data packet 306. The polynucleotide strands 404 generated from the sequence mapping data 308 may be stored in a pool of polynucleotides strands 406. The pool of polynucleotides strands 406 may include multiple polynucleotide strands 404 that each correspond to a particular data block or segment of user data, such as user data 103.

Figure 7:
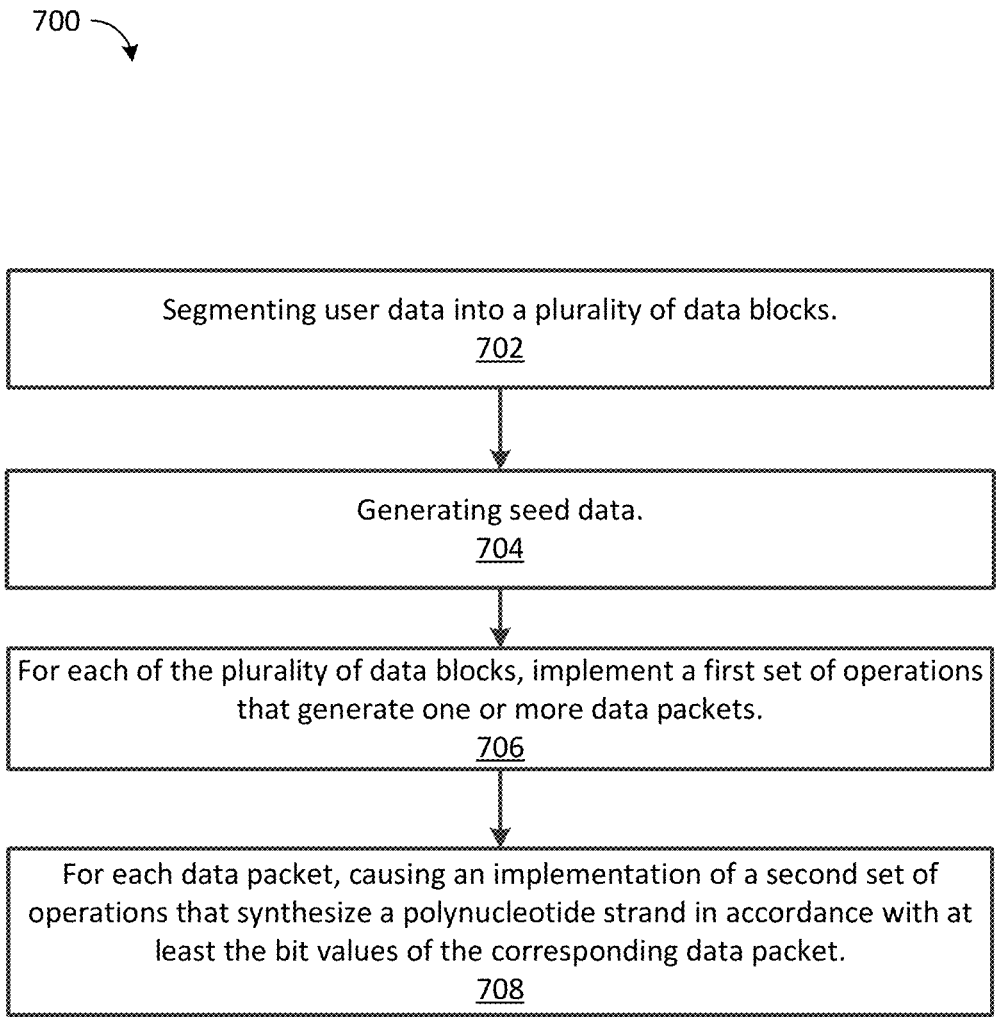
FIG. 7 is a flowchart of an exemplary process for monitoring a digital asset associated with a distributed ledger.

FIG. 7 is a flowchart of an exemplary process 700 for encoding data for storage in genetic materials. For example, one or more computing systems, such as ED computing system 110, may perform one or more steps of exemplary process 700, as described below in reference to FIG. 7. Referring to FIG. 7, ED computing system 110 may perform any of the processes described herein to segment user data 103 into a plurality of data blocks (e.g., in step 702 of FIG. 7). In some examples, ED computing system 110 may obtain user data 103 from a client device 101, such as client device 101A. In other examples, executed segmenting engine 117A may segment the user data into multiple (e.g., 4 to 2048) smaller data blocks of roughly equal non-overlapping size. In instances, executed segmenting engine 117A may generate store the one or more segments or data blocks within corresponding portions of data repository 111, such as user data database 112.

Additionally, ED computing system 110 may perform any of the processes described herein to generate seed data (e.g., in step 704 of FIG. 7). In some examples, executed FC seed engine 117B may implement operations to generate seed data. As described herein, the seed data may identify and characterize a number of fountain code seeds. In some examples, executed FC seed engine 117B may implement a random generator process to generate each of the fountain code seeds included in the seed data. In some instances, each of the fountain code seeds may include a set or fixed number of random values, such as 26 to 32 bits. In other instances, executed FC seed engine 117B may generate a fountain code seed based on the size of the user data.

For instance, executed FC seed engine 117B may obtain, from user data database 112 the data blocks of user data 103 or prior to segmentation, user data 103. Additionally, executed FC seed engine 117B may determine a size of user data 103 based on the data blocks of user data 103 or user data 103 itself. Moreover, executed FC seed engine 117B may generate a fountain code seed corresponding to the determined size of user data 103 (e.g., larger the size of the user data, the larger the size of the fountain code seed).

In various instances, the fountain code seed generated by executed FC seed engine 117B may correspond to a particular data block and a set of data elements associated with the particular data block. In such instances, the set of random values included in a fountain code seed may identify the particular data block, a number of data elements included in the set of data elements associated with the particular data block, and which of the data elements are to be included in the set of data elements of the particular block. Additionally, executed FC seed engine 117B may generate such fountain code seed based on portions of metadata stored in metadata database 113 associated with the particular block. As described herein, the fountain code seed may include information sufficient to describe contents of a corresponding data packet that ED computing system 110 may use when decoding the corresponding data packet. In some instances, executed FC seed engine 117B may generate seed data that includes one or more fountain code seed generated by executed FC seed engine 117B.

Moreover, executed FC seed engine 117B may embed or include within the fountain code seeds, portions of the metadata stored in metadata database 113 that characterizes and identifies a number of encoding-decoding parameters. In some examples, executed FC seed engine 117B may, for each data block of a user data, such as user data 103, obtain corresponding metadata from metadata database 113. Additionally, the corresponding metadata of each of the data blocks of the user data may include encoding-decoding parameters. As described herein, each encoding-decoding parameter may characterize a characteristic of the encoding and decoding process used for the received user data, such as the one or more data blocks. Additionally, the encoding-decoding parameters may be based in part and depend on the size of the received or obtained user data, such as user data 103.

Additionally, executed FC seed engine 117B may, for each of one or more fountain code seeds, generate a corresponding seed metadata or metacode. In such instances, for each of the one or more fountain code seeds, executed FC seed engine 117B may apply one or more mix functions to the corresponding fountain code seed to generate the corresponding seed metadata. As described herein, the one more mixing functions may be deterministic-producing the same result for a specific data packet, no matter what order the data packets are processed, not be biased and may have a very flat distribution over the entire set of results. In some instances, each of the one or more mixing functions may include a set of xor-shift functions configured for long cycle pseudo-random number generation.

Referring back to FIG. 3, executed FC seed engine 117B may generate, for each fountain code seed, seed metadata based in part on the outputs of each of the one or more mixing functions. For instance, the seed metadata may include the corresponding data block identifier, for each of the data elements included in the corresponding data block, a corresponding value representing a metadata bit and a corresponding value representing one of multiple states. In some instances, executed FC seed engine 117B may store, the seed data and the seed metadata of each fountain code seed included in the seed data within corresponding portions of data repository 111, such as FC seed database 114.

Moreover, ED computing system 110 may perform any of the processes described herein to, for each of the plurality of data blocks, implement a first set of operations that generate one or more data packets (e.g., in step 704 of FIG. 7). In some examples, executed encoding engine 117C may utilize seed data and seed metadata to encode user data, such as user data 103 obtained from one or more client devices 101. As described herein, executed encoding engine 117C may encode each data block of the user data. In such examples, executed encoding engine 117C may encode the data blocks of the user data simultaneously or in parallel, or alternatively in series. Additionally, executed encoding engine 117C may, for each data block, apply a fountain code (e.g., a Luby Transform) to each data element of each corresponding data block. Moreover, executed encoding engine 117C may generate and package into one or more portions of a data packet a random set of data elements. Further, executed encoding engine 117C may combine the random set of data elements together, bitwise, under a binary field. The combined random set of data elements may be the payload of the corresponding data package and may include information necessary to describe the original user data when processed, such as decoded, with a sufficient number of other data packets.

For example, executed encoding engine 117C may obtain metadata of each data block of user data 103 obtained from one or more client devices 101, such as client device 101A.

Additionally, executed encoding engine 117C may obtain, from FC seed database 114, seed data and corresponding seed metadata. Moreover, for each data block, executed encoding engine 117C may select a particular potential fountain code seed from the obtained seed data. Based on the corresponding seed metadata of the potential fountain code seed and metadata associated with the corresponding data block, executed encoding engine 117C may determine whether the identifier identified in the metadata of the corresponding data block matches the data block identifier of the seed metadata. In examples where executed encoding engine 117C determines the identifier identified in the metadata of the corresponding data block does not match the data block identifier of the seed metadata, executed encoding engine 117C may select another potential fountain code seed. Additionally, executed encoding engine 117C may repeat the process of determining whether the identifier identified in the metadata of the corresponding data block matches the data block identifier of the seed metadata of the second potential fountain code seed. Executed encoding engine 117C may keep repeating the process until the data block identifier of a potential fountain code matches the identifier identified in the metadata of the corresponding data block.

In examples where executed encoding engine 117C determines the identifier identified in the metadata of the corresponding data block or segment matches the data block identifier of the seed metadata, executed encoding engine 117C may determine whether the potential fountain code seed has been utilized to generate another data packet of a random set of data elements. In examples where executed encoding engine 117C determines the fountain code seed has been utilized to generate another data packet of a random set of data elements, executed encoding engine 117C may select another potential fountain code seed from the seed data. As described herein, executed encoding engine 117C may repeat the above described processes to determine a potential fountain code seed that includes a data block identifier that matches the identifier identified in the metadata of the corresponding data block and that hasn't been utilized to generate another data packet of a random set of data elements.

In examples where executed encoding engine 117C determines the potential fountain code seed has not been utilized to generate another data packet of a random set of data elements, executed encoding engine 117C may determine whether the one or more values that represent in the corresponding metadata bit in the seed metadata and corresponding value that represents one of multiple states (e.g., "isZero," "isOne," "noInfo") are identified in the metadata of the corresponding block data. In examples where executed encoding engine 117C determines the one or more values that represent in the corresponding metadata bit in the seed metadata and corresponding value that represents one of multiple states are not identified in the metadata of the corresponding block data, executed encoding engine 117C may select another potential fountain code seed. As described herein, executed encoding engine 117C may repeat the above described processes to determine a potential fountain code seed that (1) includes a data block identifier that matches the identifier identified in the metadata of the corresponding data block, (2) that hasn't been utilized to generate another data packet of a random set of data elements, and (3) includes one or more values that represent in the corresponding metadata bit in the seed metadata and corresponding value that represents one of multiple states (e.g., "isZero," "isOne," "noInfo") are identified in the metadata of the corresponding block data.

In examples where executed encoding engine 117C determines the one or more values that represent in the corresponding metadata bit in the seed metadata and corresponding value that represents one of multiple states are identified in the metadata of the corresponding block data or segment, executed encoding engine 117C may utilize the potential fountain code seed and/or corresponding seed metadata to generate data packet 306 with a payload corresponding to the potential fountain code seed. For example, the payload may include the set of random data elements identified in the potential fountain code seed and/or corresponding seed metadata. Additionally, as described herein, each data element of the set of random data elements may be encoded, by executed encoding engine 117C, using fountain code (e.g., a Luby Transform). In some instances, executed encoding engine 117C may combine each of the encoded data elements of the set of random data elements and package the combined encoded data elements into one or more portions of data packet 306. Moreover, as described herein, executed encoding engine 117C may package into one or more portions of the data packet 306, the corresponding potential fountain code seed. As described herein, executed encoding engine 117C may, for each data block identified in the metadata, repeat the processes as described herein until all the data elements identified in the metadata of a corresponding data block are included in data packets 306. In some instances, executed encoding engine 117C may, for each data block of user data 103, store the generated data packet 306 within corresponding portions of data repository 111, such as encoded data database 115A.

Further, ED computing system 110 may, for each data packet, causing an implementation of a second set of operations that synthesize a polynucleotide strand in accordance with at least the bit values of the corresponding data packet (e.g., in step 706 of FIG. 7). In some examples, genetic computing system 120 may utilize sequence mapping data 308 generated from each data packet to generate a corresponding polynucleotide strand and store the corresponding polynucleotide strand in a pool of polynucleotide strands. The pool of poly nucleotides may include multiple polynucleotide strands that each correspond to a particular data block or segment of the user data.

C. Computer-Implemented Techniques for Decoding User Data from Polynucleotide Strands As described herein, encoder-decoder (ED) computing system 110 may implement operations that decode data derived from genetic materials, such as one or more polynucleotide strands. Additionally, ED computing system 110 may utilize fountain code (FC) process to decode such data. In some examples, genetic computing system 120 may process and sequence one or more polynucleotide strands in a pool of polynucleotide strands and generate sequence data identifying the sequence of bases of each of the one or more polynucleotide strands. Moreover, ED computing system 110 may generate sequence bit data based on the sequence data. The sequence bit data may identify a sequence of bits corresponding to each of the sequence of bases of each of the one or more polynucleotide strands identified in the sequence data.

Figure 5:
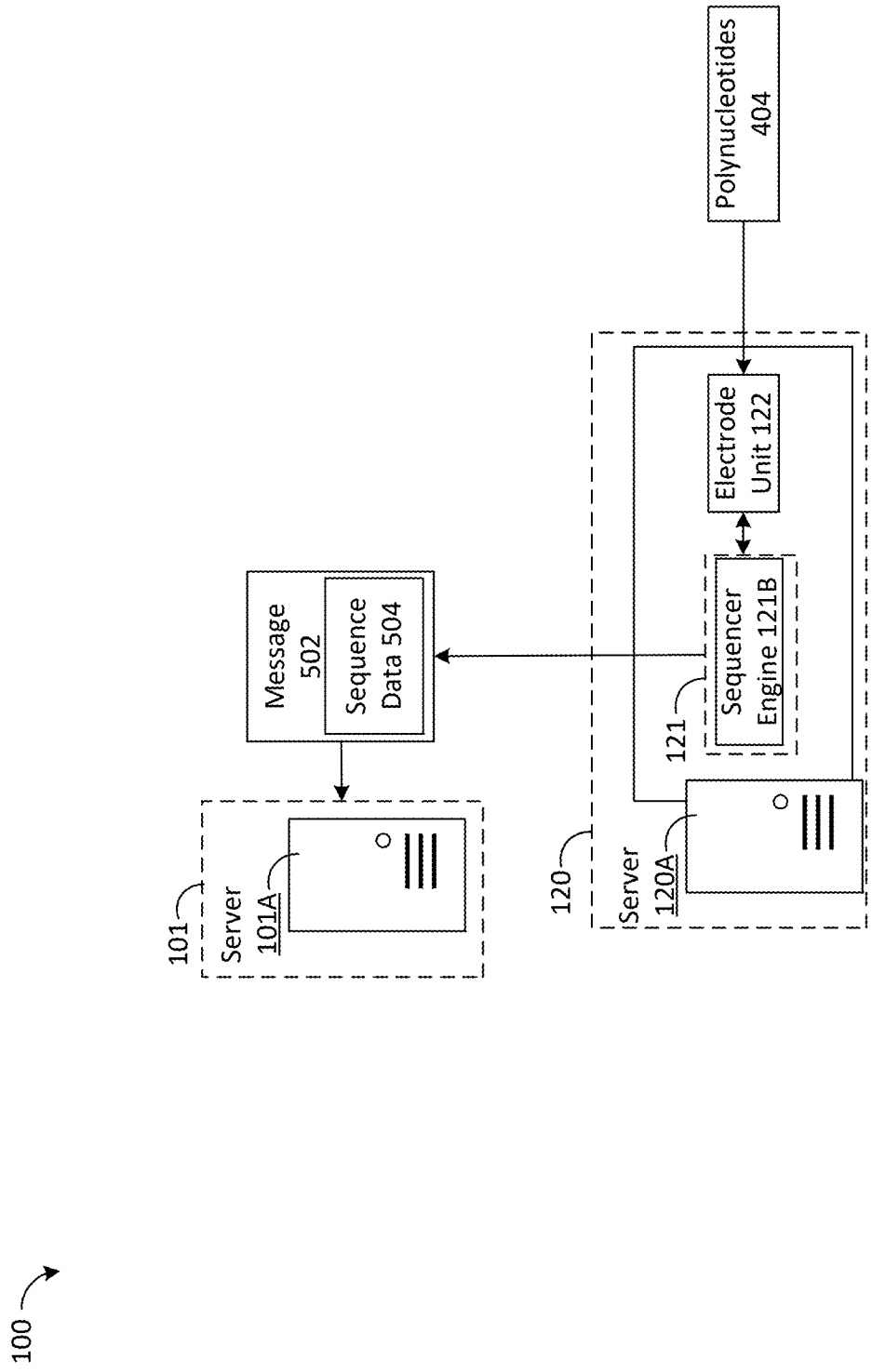

For instance, as illustrated in FIG. 5, a pool of polynucleotides strands 406 may include one or more polynucleotides strands 404. Additionally, one or more electrodes of electrode unit 122 may determine a sequence of bases of each of the one or more polynucleotides strands 404 of the pool of polynucleotides strands 406. Executed sequencer engine 121B may generate sequence data 504 that identifies the determined sequence of bases of each of the one or more polynucleotides strands 404. As described herein, each of the one or more polynucleotides strands 404 and pool of polynucleotides strands 406 may be associated with user data, such as user data 103. Moreover, executed sequencer engine 121B may generate a message 502 and package within one or more portions of message 502 sequence data 504. Further, executed sequencer engine 121B may transmit message 502 to server 110A of ED computing system 110. As described herein ED computing system 110 may utilize sequence data 504 to rebuild and decode user data 103.

Figure 6:
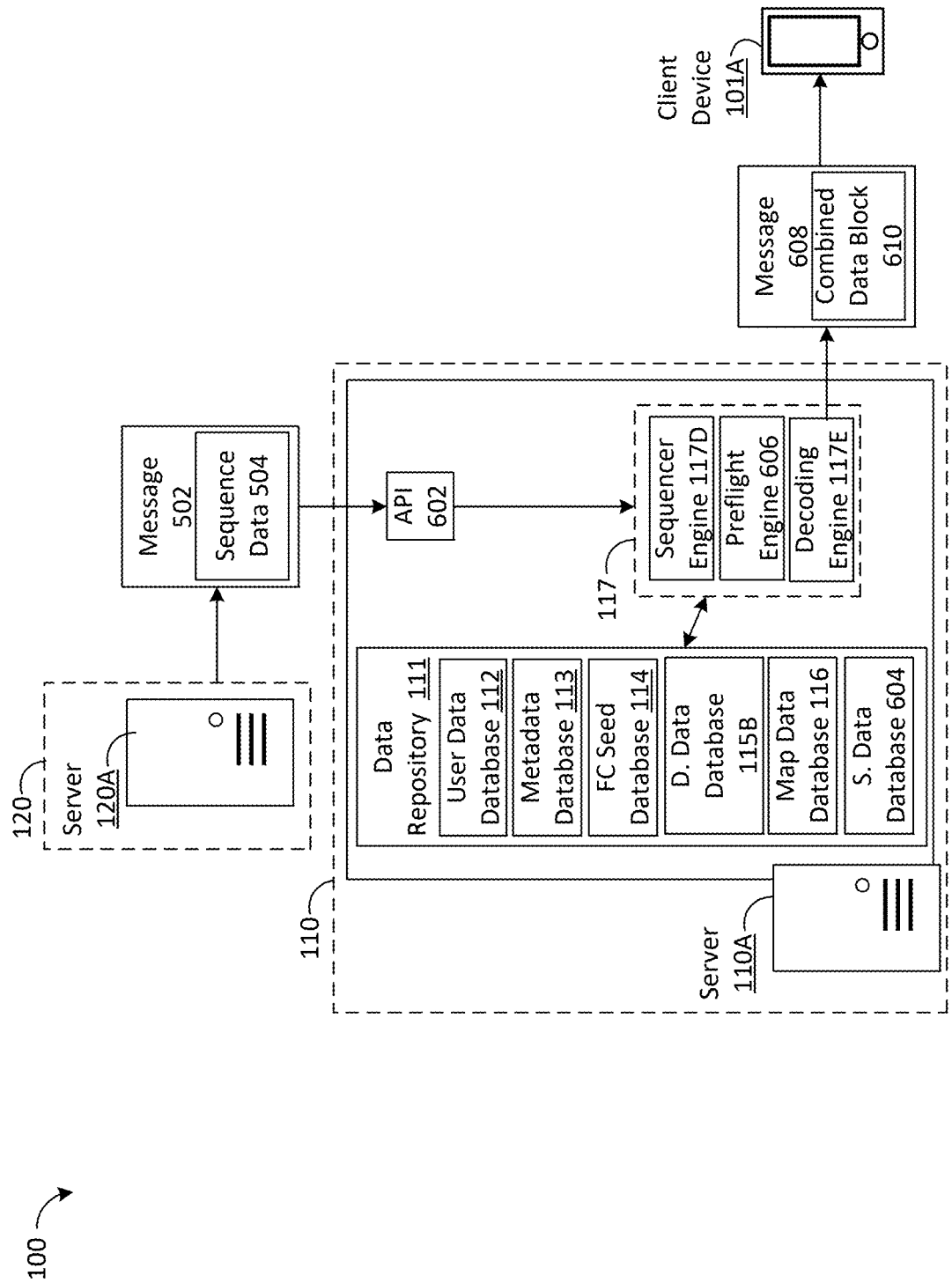

As illustrated in FIG. 6, a programmatic interface established and maintained by server 110A of ED computing system 110, such as API 602, may receive message 502 that includes sequence data 504. As described herein, ED computing system 110 may receive message 502 across communications network 130 via a channel of communications established programmatically between API 602 and executed sequencer engine 121B. Moreover, API 602 may route message 304 to executed sequencer engine 117D. Executed sequencer engine 117D may parse message 502 and obtain sequence data 504. Further, executed sequencer engine 117D may store sequence data 504 within one or more portions of data repository 111, such as sequence data database 604.

Additionally, executed sequencer engine 117D may execute operations that determine a sequence of bits corresponding to a sequence of bases identified in sequence data 504. In some examples, executed sequencer engine 117D may obtain sequence data 504 from sequence data database 604. Additionally, executed sequencer engine 117D may obtain from map data database 116, mapping data. Based on the mapping data and sequence data 504, executed sequencer engine 117D may determine a sequence of bits corresponding to the sequence of bases identified in sequence data 504. Moreover, executed sequencer engine 117D may generate sequenced bit data identifying the sequence of bits corresponding to the sequence of bases identified in sequence data 504. In some instances, executed sequencer engine 117D may store sequence bit data within one or more portions of data repository 111, such as sequence data database 604.

As described herein, in some instances, each polynucleotide strand 404 may include primers, such as a front primer and/or an end primer that book end the fountain code seed and the payload. Additionally, the sequence of bases in the front primer and end primer are the same for each polynucleotide strand 404. Such information, not illustrated in FIG. 1, may be obtained or already encoded into executed sequencer engine 117D, and may be utilized to identify and/or trim the primers from the sequence of the polynucleotide strand identified in sequence data 504. In other instances, each polynucleotide strand 404 may not include primers, such as a front primer and/or an end primer. In such instances, executed sequencer engine 117D may not need to identify and trim the primers from the sequence of the polynucleotide strand identified in sequence data generated by genetic computing system 120.

Referring back to FIG. 6, executed preflight engine 606 may implement a set of preflight or pre-processing operations to determine an estimated distribution of data block based on the sequence bit data of each of the sequences of bases identified in sequence data 504. For example, executed preflight engine 606 may obtain from sequence data database 604, a portion of sequence bit data. As described herein the portion of sequence bit data may be associated with a random set of polynucleotide strands 404 of the pool of polynucleotide strands 406 (e.g., a set of 100,000-200,000 polynucleotide strands out of the pool of 10,000,000 polynucleotide strands). Additionally, In some instances, the random set of polynucleotide strands 404 may include primers, such as a front end primer and a back end primer. In such instances, executed preflight engine 606 may determine the sequence of bits from the portion of sequence bit data and identify portions of the sequence of bits corresponding to primers (herein described as "primer portions") based on information known or encoded into executed decoding engine 117E associated with length and size of the primers and the sequence bit data. Moreover, executed preflight engine 606 may trim the primer portions, leaving portions of the sequence of bits that were between the primer portions (herein described as "middle portions"). As described herein the middle portions may be portions of bits corresponding to the fountain code seed and associated payload. Alternatively, in instances where the random set of polynucleotide strands does not include the primers, the executed pre-flight engine may not trim the sequence of bits corresponding to the random set of polynucleotide strands. In such instances, executed synthesis engine 121A may implement a biological protocol that uses a custom sequence primer which has the effect of removing either the front end primer and/or the back end primer of the polynucleotide sequences. As such, the remaining polynucleotide sequences or the middle portions may be sequenced by sequencer engine 121B and the corresponding sequence of bits generated by sequencer engine 117D may correspond to a fountain code seed portion and an associated payload portion.

Further, executed preflight engine 606 may obtain, from decoded data database 115B, encoding-decoding parameters. As described herein, the encoding-decoding parameters may indicate the corresponding data packet is formatted such that the fountain code seed is in front of the payload as well as the fountain code seed size and/or the payload size. Based on the remaining middle portions and the encoding-decoding parameters, executed preflight engine 606 may determine which portion of middle portions correspond to the fountain code seed and associated payload, and the size of the middle portion.

In examples where ED computing system 110 has encoded and decoded varying sizes of user data, the size of the bit sequence corresponding to the fountain code seed and the payload may vary. As described herein, data packet mapping data may be stored in ED computing system 110. Data packet mapping data may at least indicate, for each varying size of bit sequence corresponding to the fountain code seed and the payload, a particular format (e.g., whether the fountain code seed is in front or behind the payload), and size of the fountain code seed and/or payload. Additionally, while executed preflight engine 606 is implement the set of pre-flight or pre-processing operations, executed preflight engine 606 may determine the size of all the middle portions determine the majority size. Based on the majority size and the data packet mapping data, executed preflight engine 606 may determine the estimated fountain code seed size, the payload size, and which portions of the middle portions correspond to the fountain code seed and which portions of the middle portions correspond to the payload.

Referring back to FIG. 6, executed preflight engine 606 may determine which portions of the portions of the sequence of bits corresponding to fountain code seed (herein described as "fountain code seed portions") is associated with an identifier of a data block. Additionally, based on the fountain code seed portions of the middle portions that are determined to be associated with an identifier of a data block, executed preflight engine 606 may determine an identifier of a data block. Further, executed preflight engine 606 may determine the distribution of identifier of data blocks based on the determined identifier of data blocks of each of the fountain code seed portions. In some instances, executed preflight engine 606 may generate a histogram that identifies and characterizes the distribution of identifiers of data blocks. Additionally, or alternatively, executed preflight engine 606 may generate data block plan data that identifies and characterizes the determined distribution of identifiers of data blocks. In some instances, executed decoding engine 117E may store the generate data block plan data within corresponding portions of data repository 111, such as decoded data database 115B.

Executed decoding engine 117E may implement a set of operations to recover or generate seed metadata or metacode corresponding to each identified or determined portion of a sequence of bits associated with a second set of polynucleotide strands 404. In some examples, the second set of polynucleotide strands 404 may be all the polynucleotide strands that were sequenced (e.g., the pool of polynucleotide strands 406). In such examples, executed decoding engine 117E may obtain, from sequence data database 604, sequence bit data associated with each sequence of bases identified in sequence data 504. Based on the sequence bit data of the second set of polynucleotide strands 404, executed decoding engine 117E may determine a sequence of bits associated with the second set of polynucleotide strands. In instances where the second set of polynucleotide strands includes primers, such as a front end primer and a back end primer, executed decoding engine 117E may identify portions of the sequence of bits corresponding to primer portions based on information known or encoded into executed decoding engine 117E associated with length and size of the primers, and trim the primer portions. Each of the remaining portions may correspond to a portion of bits corresponding to fountain code seed and an associated payload otherwise described as the middle portions. Alternatively, the second set of polynucleotide strands 404 may not include the primers. In such instances, executed synthesis engine 121A may implement a biological protocol that uses a custom sequence primer which has the effect of removing either the front end primer and/or the back end primer of the polynucleotide sequences. As such, the remaining polynucleotide sequences may be sequenced by sequencer engine 121B and the corresponding sequence of bits generated by sequencer engine 117D may correspond to a fountain code seed portion and an associated payload portion. Moreover, executed decoding engine 117E may obtain, from decoded data database 115B, encoding-decoding parameters and determine which portion of the remaining portion of bits correspond to the fountain code seed and which portion of the remaining portion of bits correspond to the associated payload.

In some examples, executed decoding engine 117E may determine, for each portion of bits corresponding to the fountain code seed or fountain code seed portion and based on the fountain code seed portion, an identifier of a corresponding data block. Additionally, executed decoding engine 117E may determine a distribution of the identifiers of data blocks associated with the second set of polynucleotide strands based on the determined data block identifier of the fountain code seed portion. In some examples, executed decoding engine 117E may determine whether the distribution of the identifiers of the data blocks associated with the second set of polynucleotide strands matches the distribution of the identifiers of the data blocks identified in data block plan data. In examples where the distribution of the identifiers of the data blocks associated with the second set of polynucleotide strands does not match the distribution of the identifiers of the data blocks identified in data block plan data, executed decoding engine 117E may implement additional recovery operations using clustering, multiple read alignment and majority base calling. In some instances, based on the distribution of the identifiers of the data blocks associated with the second set of polynucleotide strands not matching the distribution of the identifiers of the data blocks identified in data block plan data, executed decoding engine 117E may determine an identifier of a data block is missing in the second set of polynucleotide strands or from the data block plan data. In such instances, executed decoding engine 117E may implement additional recovery operations using clustering, multiple read alignment and majority base calling for such missing data blocks.

In examples where the distribution of the identifiers of the data blocks associated with the second set of polynucleotide strands matches the distribution of the identifiers of the data blocks identified in data block plan data, executed decoding engine 117E may sort each fountain code seed portion and associated of bits corresponding to the payload (herein described as "payload portion") by the corresponding data block identifier. Additionally, executed decoding engine 117E may generate list data identifying and characterizing, for each identifier of each of the data block, one or more middle portions (e.g., fountain code portion and associated payload portion with the corresponding data block identifier). In some instances, executed decoding engine 117E may store the list data within portions of data repository 111, such as decoded data database 115B.

Moreover, executed decoding engine 117E may, similar to executed FC seed engine 117B, may, for each identifier of a data block or data block identifier, apply one or more mixing functions mixing function to each fountain code seed portion to generate a corresponding seed metadata or metacode. As described herein, examples of a mixing function may include, a mixing function that when applied to each fountain code seed portion causes executed decoding engine 117E to generate a corresponding data block identifier. The data block identifier may identify a corresponding data block associated with the random set of data elements identified in the corresponding fountain code seed portion. Additionally, another example of a mixing function may include, a mixing function that when applied to each fountain code seed portion causes executed decoding engine 117E to generate for each identified data element in the set of random values identified in the corresponding fountain code seed portion, a value representing one of multiple possible states the corresponding data element can take on (e.g., "isZero," "isOne," "noInfo"). Moreover, yet another example of a mixing function may include a mixing function that when applied to each fountain code seed portion causes executed decoding engine 117E to generate, for each identified data element in the set of random values identified in the fountain code seed portion, a value representing the corresponding metadata bit. In some instances, the value representing the corresponding metadata bit may indicate to executed decoding engine 117E, which generated value representing one of multiple states is associated with which data element. In other instances, the value may be between zero and the metadata size minus one. In other instances, executed decoding engine 117E may generate seed metadata of each fountain code seed portion based on the corresponding data block or segment identifier, one or more values that each represent a metadata bit and associated value representing one of multiple states. The seed metadata of each fountain code seed portion may identify and characterize the corresponding data block or segment identifier, one or more values that each represent a metadata bit and associated value representing one of multiple states. In such instances, executed decoding engine 115E may store the seed metadata or metacode within portions of data repository 111, such as decoded data database 115B.

In some examples, executed decoding engine 117E may determine whether, for each identifier of a data block or segment, a corresponding seed metadata or metacode of each corresponding fountain code seed portion is consistent with one another. In such examples, executed decoding engine 117E may utilize one or more confidence thresholds to determine whether, for each identifier of a data block or segment, a seed metadata or metacode of each corresponding fountain code seed portion is consistent with one another. In some instances, the one or more confidence thresholds may be associated with a number of fountain code seed portions with a metadata bit of a particular value having a particular value that represents a particular state of the multiple states. For instance, for a first data block, executed decoding engine 117E may obtain seed metadata of 750 fountain code seed portions associated with an identifier of the first data block. Additionally, based on the seed metadata of 750 fountain code seed portions, executed decoding engine 117E may determine that 500 of the fountain code seed portion has a corresponding seed metadata that indicates for a metadata bit with a particular value of 1 (e.g., metadata bit 1) has a corresponding value representing a particular state of multiple states of "isZero." Executed decoding engine 117E may determine whether the metadata bit with the value of 1 of first data block has a corresponding value representing the state of "isZero," based on whether the number of fountain code seed portions with seed metadata having a metadata bit with the value of 1 that has a corresponding value representing the state of "isZero" is above or equal a confidence threshold associated with a number of metadata bit of a particular value having a particular value that represents a particular state of the multiple states. In instances, where the confidence threshold is 250 fountain code seed portions with seed metadata with a metadata bit value of 1 of first data block with a corresponding value representing the state of "isZero," executed decoding engine 117E may determine the metadata bit with the value of 1 of first data block has a corresponding value representing the state of "isZero." Alternatively, in instances where the confidence threshold is 5000 seed metadata or metacode with a metadata bit value of 1 of first data block with a corresponding value representing the state of "isZero, executed decoding engine 117E may determine the metadata bit with the value of 1 of first data block may not have a corresponding value representing the state of "isZero" or has a state of "isNoInfo."

In other instances, the one or more confidence thresholds may be based on, for a particular data block, the most number of metadata bit of a particular value with a particular value that represent a particular state of multiple states. For instance, for a second data block, executed decoding engine 117E may obtain seed metadata of a number of fountain code seed portions. Based on the obtained seed metadata, executed decoding engine 117E may determine that 100 fountain code seed portions has a corresponding seed metadata that indicates for a metadata bit with a particular value of 3 (e.g., metadata bit 3) has a corresponding value representing a particular state of multiple states of "isZero," and 350 fountain code seed portions has a corresponding seed metadata that indicates for a metadata bit with a particular value of 3 (e.g., metadata bit 3) has a corresponding value representing a particular state of multiple states of "isOne." Moreover, executed decoding engine 117E may determine the metadata bit with the value of 3 of second data block has a corresponding value representing the state of "isZero" based on the number of fountain code seed portions has a corresponding seed metadata that indicates for a metadata bit with a particular value of 3 (e.g., metadata bit 3) has a corresponding value representing a particular state of multiple states of "isZero," compared to the number of fountain code seed portions has a corresponding seed metadata that indicates for a metadata bit with a particular value of 3 (e.g., metadata bit 3) has a corresponding value representing a particular state of multiple states of "isOne."

In other examples, executed decoding engine 117E may determine whether, for each identifier of a data block or segment, the payload portion is sufficient to enable executed decoding engine 117E to recover a complete corresponding data block. In some instances, executed decoding engine 117E may make such determinations based on the seed metadata or metacode of each corresponding fountain code seed portions. In such instances, executed decoding engine 117E may determine which data elements of the corresponding data block is identified in the seed metadata of each corresponding fountain code seed portions. Additionally, based in part on the identified data elements, executed decoding engine 117E may determine whether any and which data elements of the corresponding data block is missing or incorrect. For instance, in another example, executed decoding engine 117E may determine all or the majority of the identified data elements that have a metabit value of 4 have a corresponding value associated with a state "isZero." Additionally, executed decoding engine 117E may determine a small number of identified data elements that have a metabit value of 4 have a corresponding value associated with a state of "isOne." As such, executed decoding engine 117E may determine the data element that has a metabit value of 4 may have a corresponding value associated with a state of "IsZero," and those identified with "IsOne," is incorrect. In another example, executed decoding engine 117E may determine one or more of the identified data elements that have a metabit value of 6 but no information is obtained regarding a corresponding value associated with a state of multiple states. Additionally, executed decoding engine 117E may determine a number of identified data elements that have a metabit value of 6 have a corresponding value associated with a state of "isOne." As such, executed decoding engine 117E may determine the data elements that have a metabit value of 6 with missing values associated with a state, may have a corresponding value associated with a state of "isOne."

Otherwise, in examples where executed decoding engine 117E determines all data elements are identified in the seed metadata or metacode of fountain code seed portions for each data block, executed decoding engine 117E may perform a set of operations to rebuild the original user data based on the list data and the seed metadata or metacode of each portion of bits corresponding to fountain seed code of the identifier of each data block or segment. In some examples, executed decoding engine 117E may obtain, from decoded data database 115B, list data and seed metadata of fountain code seed portions of each data block. Additionally, executed decoding engine 117E may utilize the list data and the seed metadata or metacode to initialize a decoding process, such as a fountain code decoding process. In some instances, executed decoding engine 117E may implement the decoding process to decode each data block in series or simultaneously/in-parallel. In either instances, for each data block, executed decoding engine 117E may apply the decoding process to the seed metadata and portions of the list data associated with an identifier of the corresponding data block. Additionally, for each data block, executed decoding engine 117E may generate sets of data elements from each payload portion based on the application of the decoding process to the seed metadata and portions of the list data associated with the identifier of the corresponding data block. As described herein, the list data may identify for each data block and identifier of the data block, payload portions obtained from the sequence of bits. Moreover, for each data block, executed decoding engine 117E may identify information of each data element within each set of data elements. For instance, for each data block, executed decoding engine 117E may identify a metadata bit value associated with each data element of each set, and corresponding information to be passed, such as a state of multiple states (e.g., "isZero," "isOne," "isnoInfo"). Additionally, for each data block, executed decoding engine 117E may determine the order of the data elements that reflects the data elements of each block of the user data when originally received and segmented by ED computing system 110 (e.g., executed segmenting engine 117A). The order of the data elements is based in part on the seed metadata and portions of the list data associated with the identifier of the corresponding data block. In some instances, executed decoding engine 117E may utilize a connection graph to determine the connections between each data element of a particular data block and the order of the data elements.

In some instances, executed decoding engine 117E may determine whether all data elements of a particular data block have been identified, whether the corresponding values representing one of multiple states has been determined, and whether the order of the data elements has been determined. As described herein, executed decoding engine 117E may make such determinations for each data block identified in the sequence of bits. In instances where executed decoding engine 117E has determined all data elements of a particular data block have been identified, the corresponding values representing one of multiple states have been determined, and the order of the data elements has been determined, executed decoding engine 117E may rebuild the particular data block from corresponding portions of bits corresponding to the payload and in accordance with the seed metadata, the portions of the list data associated with the identifier of the corresponding data block, and the determined corresponding order of data elements. In such instances, executed decoding engine 117E may rebuild the particular block data by building each data element from and identified in the payload portions and combine each data element in the order according to the determined corresponding order of data elements. After each data block identified from the sequence of bits has been built, executed decoding engine 117E may combine each built data block. The combined data block 610 may reflect the original user data received by ED computing system 110, such as user data 103. In some instances, executed decoding engine 117E may store the combined data block 610 and each individually built data block within corresponding portions of data repository 111, such as decoded data database 115B. In other instances, executed decoding engine 117E may generate message 608 and package within one or more portions of message 608 the rebuilt user data or combined data block 610. In such instances, executed decoding engine 117E may transmit message 608 including combined data block 610 to a client device 101 of a user that originally sent the original user data that the rebuilt user data is based off of, such as client device 101A.

Figure 8:
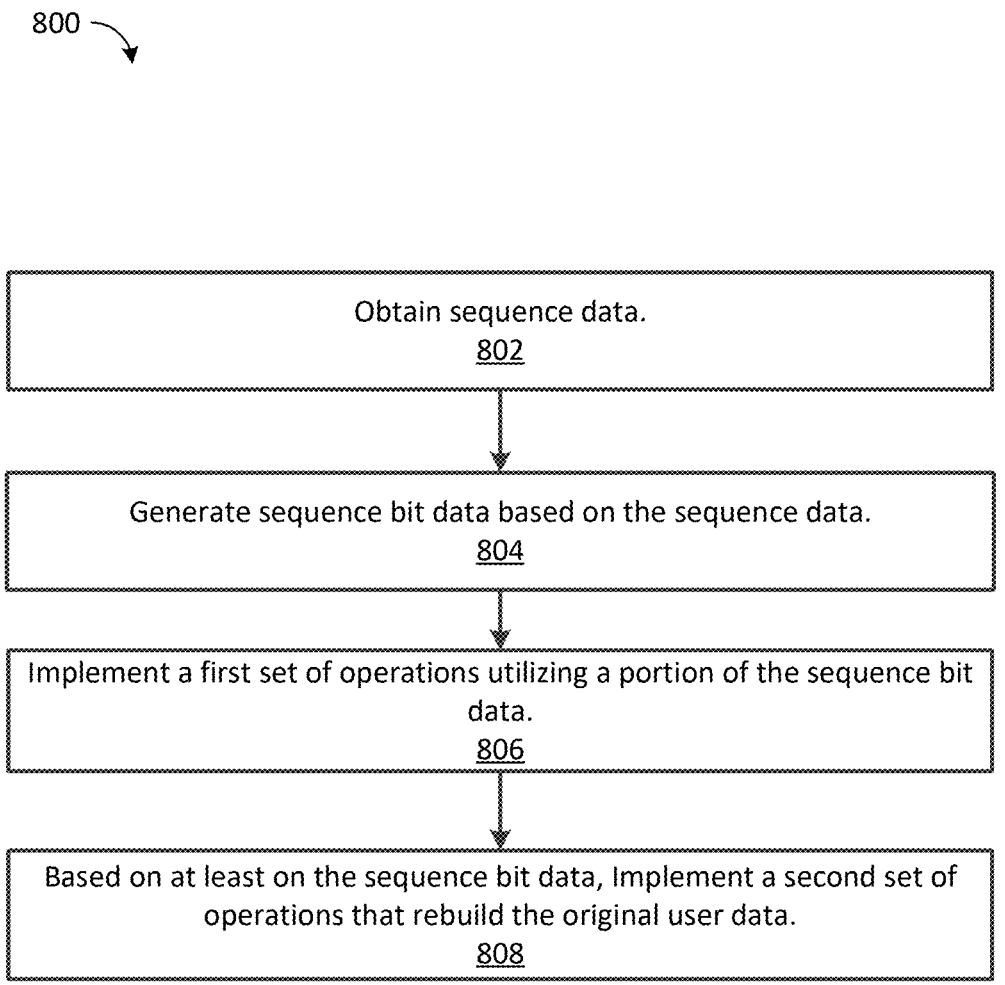
FIG. 8 is a flowchart illustrating an exemplary process for decoding data derived from genetic materials.

FIG. 8 is a flowchart of an exemplary process for decoding data derived from genetic materials. For example, one or more computing systems, such as ED computing system 110, may perform one or more steps of exemplary process 800, as described below in reference to FIG. 8. Referring to FIG. 8, ED computing system 110 may perform any of the processes described herein to obtain sequence data 504 (e.g., in step 802 of FIG. 8). In some examples, ED computing system 110 may obtain sequence data from genetic computing system 120. Additionally, ED computing system 110 may perform any of the processes described herein to generate sequence bit data based on the sequence data (e.g., in step 804 of FIG. 8). In some examples, executed sequencer engine 117D may execute operations that determine a sequence of bits corresponding to a sequence of bases identified in sequence data 504.

Moreover, ED computing system 110 may perform any of the processes described herein to implement a first set of operations utilizing a portion of the sequence bit data (e.g., in step 806 of FIG. 8). In some examples, executed preflight engine 606 may implement a set of preflight or pre-processing operations to determine an estimated distribution of data block based on the sequence bit data of each of the sequences of bases identified in sequence data 504. For example, executed preflight engine 606 may obtain from sequence data database 604, a portion of sequence bit data. As described herein the portion of sequence bit data may be associated with a random set of polynucleotide strands 404 of the pool of polynucleotide strands 406 (e.g., a set of 100,000-200,000 polynucleotide strands out of the pool of 10,000,000 polynucleotide strands).

Additionally, executed preflight engine 606 may determine the sequence of bits from the portion of sequence bit data and identify portions of the sequence of bits corresponding to primers (herein described as "primer portions") based on information known or encoded into executed decoding engine 117E associated with length and size of the primers and the sequence bit data. Moreover, executed preflight engine 606 may trim the primer portions, leaving portions of the sequence of bits that were between the primer portions (herein described as "middle portions"). As described herein the middle portions may be portions of bits corresponding to the fountain code seed and associated payload. Further, executed preflight engine 606 may obtain, from decoded data database 115B, encoding-decoding parameters. As described herein, the encoding-decoding parameters may indicate the corresponding data packet is formatted such that the fountain code seed is in front of the payload as well as the fountain code seed size and/or the payload size. Based on the remaining middle portions and the encoding-decoding parameters, executed preflight engine 606 may determine which portion of middle portions correspond to the fountain code seed and associated payload, and the size of the middle portion.

In other examples, executed preflight engine 606 may determine which portions of the portions of the sequence of bits corresponding to fountain code seed (herein described as "fountain code seed portions") is associated with an identifier of a data block. Additionally, based on the fountain code seed portions of the middle portions that are determined to be associated with an identifier of a data block, executed preflight engine 606 may determine an identifier of a data block. Further, executed preflight engine 606 may determine the distribution of identifier of data blocks based on the determined identifier of data blocks of each of the fountain code seed portions. In some instances, executed preflight engine 606 may generate a histogram that identifies and characterizes the distribution of identifiers of data blocks. Additionally, or alternatively, executed preflight engine 606 may generate data block plan data that identifies and characterizes the determined distribution of identifiers of data blocks. In some instances, executed decoding engine 117E may store the generate data block plan data within corresponding portions of data repository 111, such as decoded data database 115B. Further, ED computing system 110 may perform any of the processes described herein to implement, based on at least on the sequence bit data, implement a second set of operations that rebuild the original user data (e.g., in step 808 of FIG. 8).

D. Exemplary Hardware and Software Implementations

Embodiments of the subject matter and the functional operations described in this disclosure can be implemented in digital electronic circuitry, in tangibly-embodied computer software or firmware, in computer hardware, including the structures disclosed in this specification and their structural equivalents, or in combinations of one or more of them. Embodiments of the subject matter described in this disclosure, including application 104, segmenting engine 117A, FC seed engine 117B, encoding engine 117C, sequencer engine 117D, decoding engine 117E, sequencer engine 121B, synthesis engine 121A, application programming interface (API) 302, API 402, API 602, and preflight engine 606, can be implemented as one or more computer programs, i.e., one or more modules of computer program instructions encoded on a tangible non-transitory program carrier for execution by, or to control the operation of, a data processing apparatus (or a computing system). Additionally, or alternatively, the program instructions can be encoded on an artificially-generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including by way of example a programmable processor, a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, an application program, an engine, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) or an assisted Global Positioning System (AGPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the disclosure or of what may be claimed, but rather as descriptions of features specific to particular embodiments of the disclosure. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, unless otherwise specifically defined herein, all terms are to be given their broadest possible interpretation including meanings implied from the specification as well as meanings understood by those skilled in the art and/or as defined in dictionaries, treatises, etc. It is also noted that, as used in the specification and the appended claims, the singular forms "a," "an," and "the" include plural referents unless otherwise specified, and that the terms "comprises" and/or "comprising," when used in this specification, specify the presence or addition of one or more other features, aspects, steps, operations, elements, components, and/or groups thereof. Moreover, the terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship. In this disclosure, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only and are not to be construed as limiting the described subject matter.

The foregoing is provided for purposes of illustrating, explaining, and describing embodiments of this disclosure. Modifications and adaptations to the embodiments will be apparent to those skilled in the art and may be made without departing from the scope or spirit of the disclosure.

The invention claimed is:

1. A computing system:
 a memory storing instructions; and
 at least one processor coupled to the communications interface and to the memory, the at least one processor being configured to execute the instructions to:
  segment user data into a plurality of data blocks, each data block including metadata;
  generate seed data, the seed data characterizing a plurality of Fountain code seeds;
  for each of the plurality of data blocks, implement a first set of operations that generate one or more data packets, the set of operations including:
   for each of the plurality of Fountain code seeds:
    determining a bit value identifying a bit position in the metadata and a metaCode value identifying and characterizing information being passed by the corresponding bit value; and
    determining which of the plurality of Fountain code seeds has a metaCode value of the bit value that matches a value of the bit position identified in the metadata, each of the one or more data packets being associated with a Fountain code seed of the plurality of Fountain code seeds that has the metaCode value of the bit value that matches the value of the bit position identified in the associated metadata; and
  for each data packet, cause an implementation of a second set of operations that synthesize a polynucleotide strand in accordance with at least bit values of the corresponding data packet.

2. The computing system of claim 1, wherein the first set of operations further includes:
 for each of the plurality of Fountain code seeds:
  determining a data block identifier; and determining which of the plurality of Fountain code seeds has a data block identifier that matches a block identifier identified in the associated metadata.

3. The computing system of claim 1, wherein the first set of operations further includes:
for each of the plurality of Fountain code seeds, determining whether a particular Fountain code seed has been previously used in a synthesis of a polynucleotide strand.

4. The computing system of claim 1, wherein the second set of operations includes:
encoding each of the one or more data packets as a sequence of nucleic acids; and
based on the sequence of nucleic acids, synthesizing a polynucleotide strand.

5. The computing system of claim 4, wherein the second set of operations includes:
attaching a first primer and a second primer to each polynucleotide strand.

6. The computing system of claim 5, wherein the at least one processor is further configured to:
for each polynucleotide strand, determine whether the corresponding polynucleotide strand satisfies a set of sequence criteria.

7. The computing system of claim 6, wherein the set of sequence criteria includes:
at least one of a criterion associated with nucleotides repeating, a criterion associated with nucleotide patterns, and a criterion associated with nucleotide pair ratios.

8. The computing system of claim 1, wherein, for each data packet, causing the implementation of the second set of operations that synthesize a polynucleotide strand in accordance with at least bit values of the corresponding data packet, includes, generating and transmitting an instruction to a device, the device being configured to implement the second set of operations.

9. The computing system of claim 1, wherein, the second set of operations includes causing one or more electrodes of a set of electrodes to that synthesize a polynucleotide in accordance with at least bit values of the corresponding data packet.

10. The computing system of claim 1, wherein for each of the plurality of data blocks, the one or more data packets is associated with one or more elements of the corresponding data block.

11. The computing system of claim 1, wherein the plurality of data blocks are non-overlapping.

12. The computing system of claim 1, wherein the metadata comprises parameters for the encoding.

13. A computer-implemented method comprising:
segmenting, by at least a first processor, user data into a plurality of data blocks, each data block including metadata;
generating, by at least the first processor, seed data, the seed data characterizing a plurality of Fountain code seeds;
for each of the plurality of data blocks, implementing, by at least the first processor, a first set of operations that generate one or more data packets, the set of operations including:
for each of the plurality of Fountain code seeds:
determining a bit value identifying a bit position in the metadata and a metaCode value identifying and characterizing information being passed by the corresponding bit value; and
determining which of the plurality of Fountain code seeds has a metaCode value of the bit value that matches a value of the bit position identified in the metadata, each of the one or more data packets being associated with a Fountain code seed of the plurality of Fountain code seeds that has the metaCode value of the bit value that matches the value of the bit position identified in the associated metadata; and
for each data packet, causing, by at least the first processor, an implementation of a second set of operations that synthesize a polynucleotide strand in accordance with at least bit values of the corresponding data packet.

14. The computer-implemented method of claim 13, wherein the first set of operations further includes:
for each of the plurality of Fountain code seeds:
determining a data block identifier; and
determining which of the plurality of Fountain code seeds has a data block identifier that matches a block identifier identified in the associated metadata.

15. The computer-implemented method of claim 13, wherein the first set of operations further includes:
for each of the plurality of Fountain code seeds, determining whether a particular Fountain code seed has been previously used in a synthesis of a polynucelotide strand.

16. The computer-implemented method of claim 13, wherein the first set of operations further includes:
for each of the plurality of data blocks, determining whether the generate data packets are together associated with all of data elements of the corresponding data block.

17. The computer-implemented method of claim 13, wherein the second set of operations includes:
encoding each of the one or more data packets as a sequence of nucleic acids; and
based on the sequence of nucleic acids, synthesizing a polynucleotide strand.

18. The computer-implemented method of claim 17, wherein the second set of operations includes:
attaching a first primer and a second primer to each polynucleotide strand.

19. The computer-implemented method of claim 18, further comprising
for each polynucleotide strand, determining whether the corresponding polynucleotide strand satisfies a set of sequence criteria.

20. A non-transitory, machine-readable storage medium storing instructions that, when executed by at least one processor of a server, causes the at least one processor to perform operations that include:
segmenting user data into a plurality of data blocks, each data block including metadata;
generating seed data, the seed data characterizing a plurality of Fountain code seeds;
for each of the plurality of data blocks, implementing a first set of operations that generate one or more data packets, the set of operations including:
for each of the plurality of Fountain code seeds:
determining a bit value identifying a bit position in the metadata and a metaCode value identifying and characterizing information being passed by the corresponding bit value; and
determining which of the plurality of Fountain code seeds has a metaCode value of the bit value that matches a value of the bit position identified in the metadata, each of the one or more data packets being associated with a Fountain code seed of the plurality of Fountain code seeds that has the metaCode value of the bit value that matches the value of the bit position identified in the associated metadata; and for each data packet, implementing a second set of operations that synthesize a polynucleotide strand in accordance with at least bit values of the corresponding data packet.

* * * * *